(12) United States Patent
Agiwal

(10) Patent No.: US 11,357,051 B2
(45) Date of Patent: Jun. 7, 2022

(54) SYSTEM AND METHOD OF HANDLING BANDWIDTH PART INACTIVITY TIMER

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/227,746

(22) Filed: Dec. 20, 2018

(65) Prior Publication Data
US 2019/0200394 A1    Jun. 27, 2019

Related U.S. Application Data

(60) Provisional application No. 62/608,911, filed on Dec. 21, 2017.

(51) Int. Cl.
*H04W 74/08* (2009.01)
*H04W 16/32* (2009.01)
(Continued)

(52) U.S. Cl.
CPC ..... *H04W 74/0833* (2013.01); *H04L 41/0654* (2013.01); *H04W 16/32* (2013.01);
(Continued)

(58) Field of Classification Search
CPC . H04W 74/0833; H04W 16/32; H04W 28/20; H04W 72/042; H04W 72/14; H04L 41/0654
See application file for complete search history.

(56) References Cited

U.S. PATENT DOCUMENTS 8,934,391 B2   1/2015 Yi et al.
10,693,620 B2   6/2020 Zhou et al.
(Continued)

FOREIGN PATENT DOCUMENTS

EP    3 500 038 A1    6/2019

OTHER PUBLICATIONS

3GPP; TSGRAN; NR; Medium Access Control (MAC) protocol specification (Release 15), 3GPP TS 38.321 V2.0.0, 11, pp. 38-39; Dec. 2017.
(Continued)

*Primary Examiner* — Alpus Hsu
*Assistant Examiner* — Camquyen Thai
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of a UE is provided. The method includes receiving, from a base station, physical downlink control channel (PDCCH) for bandwidth part (BWP) switching of a serving cell; identifying whether there is ongoing random access procedure associated with the serving cell; and performing BWP switching based on the PDCCH in response to identifying that there is no ongoing random access procedure.

4 Claims, 14 Drawing Sheets

(51) Int. Cl.
- *H04W 72/04* (2009.01)
- *H04W 72/14* (2009.01)
- *H04L 12/24* (2006.01)
- *H04W 28/20* (2009.01)
- *H04L 41/0654* (2022.01)

(52) U.S. Cl.
CPC ......... *H04W 28/20* (2013.01); *H04W 72/042* (2013.01); *H04W 72/14* (2013.01)

(56) References Cited

U.S. PATENT DOCUMENTS

| | | | |
|---|---|---|---|
| 10,959,271 | B2 | 3/2021 | Yi et al. |
| 2010/0034161 | A1 | 2/2010 | Luo et al. |
| 2010/0074204 | A1 | 3/2010 | Meylan |
| 2011/0110240 | A1 | 5/2011 | Bergquist et al. |
| 2014/0036747 | A1 | 2/2014 | Nory et al. |
| 2015/0173016 | A1 | 6/2015 | Heo et al. |
| 2016/0100429 | A1 | 4/2016 | Bostrom et al. |
| 2016/0309517 | A1 | 10/2016 | Park et al. |
| 2016/0353510 | A1 | 12/2016 | Zhang et al. |
| 2017/0034853 | A1 | 2/2017 | Rune et al. |
| 2017/0201308 | A1* | 7/2017 | Park .............. H04B 7/0417 |
| 2017/0295489 | A1 | 10/2017 | Agiwal et al. |
| 2018/0049068 | A1 | 2/2018 | Agiwal et al. |
| 2018/0054800 | A1 | 2/2018 | Yeo et al. |
| 2018/0270698 | A1 | 9/2018 | Babaei et al. |
| 2018/0270699 | A1 | 9/2018 | Babaei et al. |
| 2018/0270700 | A1 | 9/2018 | Babaei et al. |
| 2018/0270713 | A1 | 9/2018 | Park et al. |
| 2018/0270791 | A1 | 9/2018 | Park et al. |
| 2018/0270792 | A1 | 9/2018 | Park et al. |
| 2018/0270855 | A1 | 9/2018 | Loehr et al. |
| 2018/0270868 | A1 | 9/2018 | Ou et al. |
| 2018/0270894 | A1 | 9/2018 | Park et al. |
| 2018/0270895 | A1 | 9/2018 | Park et al. |
| 2018/0279193 | A1 | 9/2018 | Park et al. |
| 2018/0279218 | A1 | 9/2018 | Park et al. |
| 2018/0279229 | A1 | 9/2018 | Dinan et al. |
| 2018/0279262 | A1 | 9/2018 | Babaei et al. |
| 2018/0279358 | A1 | 9/2018 | Babaei et al. |
| 2018/0279377 | A1 | 9/2018 | Lin et al. |
| 2018/0288746 | A1 | 10/2018 | Zhang et al. |
| 2018/0368169 | A1 | 12/2018 | Jung et al. |
| 2018/0376375 | A1 | 12/2018 | Turtinen et al. |
| 2019/0037423 | A1 | 1/2019 | Yu et al. |
| 2019/0044689 | A1 | 2/2019 | Yiu et al. |
| 2019/0045491 | A1 | 2/2019 | Zhang et al. |
| 2019/0045549 | A1 | 2/2019 | Wu |
| 2019/0074882 | A1 | 3/2019 | Zhou et al. |
| 2019/0090299 | A1 | 3/2019 | Ang et al. |
| 2019/0097874 | A1 | 3/2019 | Zhou et al. |
| 2019/0103953 | A1 | 4/2019 | Liao et al. |
| 2019/0103954 | A1* | 4/2019 | Lee .............. H04L 5/0098 |
| 2019/0124558 | A1 | 4/2019 | Ang et al. |
| 2019/0124715 | A1 | 4/2019 | Chen et al. |
| 2019/0132110 | A1 | 5/2019 | Zhou et al. |
| 2019/0132824 | A1 | 5/2019 | Jeon et al. |
| 2019/0132845 | A1* | 5/2019 | Babaei .............. H04W 72/0453 |
| 2019/0132855 | A1 | 5/2019 | Lee et al. |
| 2019/0132857 | A1 | 5/2019 | Babaei et al. |
| 2019/0132862 | A1 | 5/2019 | Jeon et al. |
| 2019/0141546 | A1* | 5/2019 | Zhou .............. H04W 72/0413 |
| 2019/0141592 | A1 | 5/2019 | Park et al. |
| 2019/0141695 | A1 | 5/2019 | Babaei et al. |
| 2019/0149305 | A1 | 5/2019 | Zhou et al. |
| 2019/0150183 | A1 | 5/2019 | Aiba et al. |
| 2019/0159100 | A1 | 5/2019 | Liou et al. |
| 2019/0166529 | A1* | 5/2019 | Chen .............. H04L 5/0096 |
| 2019/0182870 | A1* | 6/2019 | Shih .............. H04W 16/32 |
| 2019/0200249 | A1 | 6/2019 | Toon et al. |
| 2019/0223082 | A1 | 7/2019 | He et al. |
| 2019/0261344 | A1 | 8/2019 | Grant et al. |
| 2019/0289513 | A1 | 9/2019 | Jeon et al. |
| 2019/0364602 | A1* | 11/2019 | Yi .............. H04W 72/04 |
| 2019/0373667 | A1* | 12/2019 | Jeon .............. H04W 72/1289 |
| 2020/0021372 | A1 | 1/2020 | Zhang et al. |
| 2020/0036430 | A1 | 1/2020 | Kim et al. |
| 2020/0059285 | A1 | 2/2020 | Zhang et al. |
| 2020/0059345 | A1 | 2/2020 | Pelletier et al. |
| 2020/0059397 | A1 | 2/2020 | Da Silva et al. |
| 2020/0137776 | A1 | 4/2020 | Lee et al. |
| 2020/0178141 | A1 | 6/2020 | Lee et al. |
| 2020/0205041 | A1 | 6/2020 | Ang et al. |
| 2020/0235896 | A1 | 7/2020 | Lee et al. |
| 2021/0076240 | A1 | 3/2021 | Koziol et al. |
| 2021/0167930 | A1 | 6/2021 | Jeon et al. |

OTHER PUBLICATIONS

3GPP; TSGRAN; NR; Radio Resource Control (RRC) protocol specification (Release 15), 3GPP TS 38.331 V1.0.0, 14, pp. 67-68; Dec. 2017.

Catt, 'BWP Inactivity Timer for active UL BWP', R2-1712861, 3GPP TSG-RAN WG2 Meeting #100, sections Nov. 1-3, 17, 2017, Reno, Nevada, USA.

International Search Search Report dated Mar. 28, 2019, issued in an International application No. PCT/KR2018/016489.

U.S. Non-final Office Action dated Apr. 30, 2020, issued in U.S. Appl. No. 16/227,816.

U.S. Final Office Action dated Jul. 6, 2020, issued in U.S. Appl. No. 16/227,705.

U.S. Non-final Office Action dated Feb. 4, 2020, issued in U.S. Appl. No. 16/227,569.

U.S. Non-final Office Action dated Mar. 9, 2020, issued in U.S. Appl. No. 16/227,705.

ETSI MCC, "Report of 3GPP TSG RAN2#100 meeting, Reno, Nevada, USA", 3GPP Draft; Draft_RAN2#100_Meeting_Report_V1, 3rd Generation Partnership Project (3GPP), Mobile Competence Centre, 650, Route Des Lucioles, F-06921 Sophia-Antipolis Cedex, France, vol. RAN NG2, Athens, Greece; Feb. 26, 2018-Mar. 2, 2018, Dec. 18, 2017, XP051372945, Retrieved from the Internet: URL:http://www.3gpp.org/ftp/tsg%5Fran/WG2%5FRL2/TSGR2%5F100/Report/, [retrieved on Dec. 18, 2017].

Extended European Search Report dated Jul. 22, 2020, issued in European Patent Application No. 18892028.4.

3GPP, "3rd Generation Partnership Project; Technical Specification Group Radio Access Network; NR; Medium Access Control (MAC) protocol specification (Release 15)", Sep. 25, 2018, 3GPP, 3GPP TS 38.321 V15.3.0, Total pp. 11 (Year: 2018).

Da Silva et al., U.S. Appl. No. 62/501,823 of US 2020/0059397 A1, May 5, 2017, USPTO, whole document (Year: 2017).

Shih et al., "Method and apparatus of handling BWP inactivity timer during Random Access procedure in a wireless communication system", Dec. 13, 2017, ASUSTek Computer Inc., U.S. Appl. No. 62/598,078, Total pp. 48.

Zhou et al., U.S. Appl. No. 62/555,359 of US 2019/0074882 A1, Sep. 7, 2017, USPTO, whole document (Year: 2017).

U.S. Final Office Action dated Sep. 17, 2020, issued in U.S. Appl. No. 16/227,832.

U.S. Non-final Office Action dated Nov. 3, 2020, issued in U.S. Appl. No. 16/227,705.

U.S. Final Office Action dated Dec. 3, 2020, issued in U.S. Appl. No. 16/227,816.

U.S. Final Office Action dated Aug. 4, 2020, issued in U.S. Appl. No. 16/227,569.

U.S. Non-final Office Action dated Dec. 18, 2020, issued in U.S. Appl. No. 16/227,569.

U.S. Final Office Action dated Apr. 21, 2021, issued in U.S. Appl. No. 16/227,705.

U.S. Non-final Office Action dated Sep. 2, 2021, issued in U.S. Appl. No. 16/227,832.

U.S. Non-final Office Action dated Sep. 2, 2021, issued in U.S. Appl. No. 16/227,705.

U.S. Non-final Office Action dated Mar. 9, 2020, issued in U.S. Appl. No. 16/227,832.

U.S. Non-final Office Action dated Dec. 24, 2021, issued in U.S. Appl. No. 16/227,832.

(56) References Cited

OTHER PUBLICATIONS

U.S. Final Office Action dated Mar. 10, 2022, issued in U.S. Appl. No. 16/227,705.
LG Electronics Inc, "TP for BWP", 3GPP Draft, R2-1714046 TP for BWP, 3rd Generation Partnership Project (3GPP), RAN WG2, Reno, USA, Nov. 27, 2017-Dec. 1, 2017, Dec. 2, 2017, XP051372722.
Extended European Search Report dated Feb. 17, 2022, issued in European Patent Application No. 21185264.5.

* cited by examiner

SYSTEM AND METHOD OF HANDLING BANDWIDTH PART INACTIVITY TIMER

CROSS-REFERENCE TO RELATED APPLICATION(S)

This application is based on and claims priority under 35 U.S.C. § 119 of a U.S. Provisional application Ser. No. 62/608,911, filed on Dec. 21, 2017, in the U.S. Patent and Trademark Office, the disclosure of which is incorporated by reference herein in its entirety.

BACKGROUND

1. Field

The disclosure relates to a wireless communication system. More particularly, the disclosure relates to a method and apparatus for handling bandwidth part inactivity timer. More particularly, the disclosure relates to a method and apparatus for a random access procedure initiated for requesting system information. More particularly, the disclosure relates to a method and apparatus for bandwidth part (BWP) switching. More particularly, the disclosure relates to a method and apparatus for a random access procedure initiated for a beam failure recovery.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. In 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, multiple-input multiple-output (MIMO), and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

In accordance with an aspect of the disclosure, a method of a user equipment (UE) in a wireless communication system is provided. The method includes receiving, from a base station, first information of a first timer of a bandwidth part inactivity associated with a bandwidth part of a primary cell (PCell) and second information of a second timer of a bandwidth part inactivity associated with a bandwidth part of a secondary cell (SCell); identifying that a random access procedure is initiated on the PCell or the SCell; stopping the first timer, if running, in response to identifying that the random access procedure is initiated on the PCell; and stopping the first timer and the second timer, if running, in response to identifying that the random access procedure is initiated on the SCell.

The SCell and the PCell are associated with the random access procedure.

The random access procedure is performed based on an active uplink (UL) bandwidth part (BWP) of the PCell or the SCell.

The random access procedure is performed based on an active downlink (DL) bandwidth part (BWP) of the PCell.

In accordance with an aspect of the disclosure, a method of a base station is provided. The method includes transmitting, to a user equipment (UE), first information of a first timer of a bandwidth part inactivity associated with a bandwidth part of a primary cell (PCell) and second information of a second timer of a bandwidth part inactivity associated with a bandwidth part of a secondary cell (SCell); receiving, from the UE, a first message associated with a random access procedure on the PCell or the SCell; and transmitting, to the UE, a second message associated with the random access procedure on the PCell, wherein the first timer, if running, is stopped in response to identifying that the random access procedure is initiated on the PCell, and wherein the first timer and the second timer, if running, are stopped in response to identifying that the random access procedure is initiated on the SCell.'

The SCell and the PCell are associated with the random access procedure.

The first message including physical random access channel (PRACH) preamble is received on an active uplink (UL) bandwidth part (BWP) of the PCell or the SCell.

The second message including random access response (RAR) is transmitted on an active downlink (DL) bandwidth part (BWP) of the PCell.

In accordance with an aspect of the disclosure, a UE in a wireless communication system is provided. The UE includes a transceiver; and at least one processor coupled to the transceiver, the processor configured to: control the transceiver to receive, from a base station, first information of a first timer of a bandwidth part inactivity associated with a bandwidth part of a primary cell (PCell) and second information of a second timer of a bandwidth part inactivity associated with a bandwidth part of a secondary cell (SCell); identify that a random access procedure is initiated on the PCell or the SCell; stop the first timer, if running, in response to identifying that the random access procedure is initiated on the PCell; and stop the first timer and the second timer, if running, in response to identifying that the random access procedure is initiated on the SCell.

The SCell and the PCell are associated with the random access procedure.

The random access procedure is performed based on an active uplink (UL) bandwidth part (BWP) of the PCell or the SCell.

The random access procedure is performed based on an active downlink (DL) bandwidth part (BWP) of the PCell.

In accordance with an aspect of the present disclosure, a base station in a wireless communication system is provided. The base station includes a transceiver; and at least one processor coupled to the transceiver, the processor configured to control the transceiver to: transmit, to a user equipment (UE), first information of a first timer of a bandwidth part inactivity associated with a bandwidth part of a primary cell (PCell) and second information of a second timer of a bandwidth part inactivity associated with a bandwidth part of a secondary cell (SCell); receive, from the UE, a first message associated with a random access procedure on the PCell or the SCell; and transmit, to the UE, a second message associated with the random access procedure on the PCell, wherein the first timer, if running, is stopped in response to identifying that the random access procedure is initiated on the PCell, and wherein the first timer and the second timer, if running, are stopped in response to identifying that the random access procedure is initiated on the SCell.

The first message including physical random access channel (PRACH) preamble is received on an active uplink (UL) bandwidth part (BWP) of the PCell or the SCell.

The second message including random access response (RAR) is transmitted on an active downlink (DL) bandwidth part (BWP) of the PCell.

In accordance with an aspect of the disclosure, a method of a user equipment (UE) in a wireless communication system is provided. The method includes receiving, from a base station, first information of a timer associated with bandwidth part (BWP) inactivity; receiving, from the base station, physical downlink control channel (PDCCH) on an active BWP associated with a serving cell; identifying whether there is ongoing random access procedure associated with the serving cell; and starting or re-starting the timer in response to identifying that there is no ongoing random access procedure associated with the serving cell.

The active BWP is different from either a default downlink (DL) bandwidth part (BWP) or an initial BWP.

The PDCCH indicates a downlink assignment or an uplink grant.

The PDCCH is received on the active BWP or received for the active BWP.

In accordance with an aspect of the disclosure, a method of a base station is provided. The method includes transmitting, to a user equipment (UE), first information of a timer associated with bandwidth part (BWP) inactivity; and transmitting, to the UE, physical downlink control channel (PDCCH) on an active BWP associated with a serving cell, wherein the timer is started or re-started in response to identifying that there is no ongoing random access procedure associated with the serving cell.

The active BWP is different from either a default downlink (DL) bandwidth part (BWP) or an initial BWP.

The PDCCH indicates a downlink assignment or an uplink grant.

The PDCCH is transmitted on the active BWP or transmitted for the active BWP.

In accordance with an aspect of the disclosure, a UE in a wireless communication system is provided. The UE includes a transceiver; and at least one processor coupled to the transceiver, the processor configured to: receive, from a base station, first information of a timer associated with bandwidth part (BWP) inactivity; receive, from the base station, physical downlink control channel (PDCCH) on an active BWP associated with a serving cell; identify whether there is ongoing random access procedure associated with the serving cell; and start or re-start the timer in response to identifying that there is no ongoing random access procedure associated with the serving cell.

The active BWP is different from either a default downlink (DL) bandwidth part (BWP) or an initial BWP.

The PDCCH indicates a downlink assignment or an uplink grant.

The PDCCH is received on the active BWP or received for the active BWP.

In accordance with an aspect of the present disclosure, a base station in a wireless communication system is provided. The base station includes a transceiver; and at least one processor coupled to the transceiver, the processor configured to control the transceiver to: transmit, to a user equipment (UE), first information of a timer associated with bandwidth part (BWP) inactivity; and transmit, to the UE, physical downlink control channel (PDCCH) on an active BWP associated with a serving cell, wherein the timer is started or re-started in response to identifying that there is no ongoing random access procedure associated with the serving cell.

The PDCCH indicates a downlink assignment or an uplink grant.

The PDCCH is transmitted on the active BWP or transmitted for the active BWP.

In accordance with an aspect of the disclosure, a method of a user equipment (UE) in a wireless communication system is provided. The method includes transmitting, to a base station, a random access preamble for initiating a random access procedure; receiving, from the base station, a random access response; transmitting, to the base station, a first message for requesting system information (SI); receiving, from the base station, physical downlink control channel (PDCCH) associated with a temporary cell radio network temporary identifier (TEMPORARY C-RNTI); identifying whether a contention resolution is successful; identifying whether a random access procedure is initiated for requesting the SI; and indicating a reception of an acknowledgement for requesting the SI to upper layer in response to identifying that the contention resolution is successful and the random access procedure is initiated for requesting the SI.

A cell radio network temporary identifier (C-RNTI) is set to a value of the TEMPORARY C-RNTI in response to identifying that the contention resolution is successful and the random access procedure is not initiated for requesting the SI.

The random access procedure is associated with contention-based random access.

A contention resolution is identified successful in response to identifying that UE Contention Resolution Identity in a MAC CE received in a MAC PDU matches a CCCH SDU transmitted in the first message In accordance with an aspect of the disclosure, a method of a base station is provided. The method includes receiving, from a user equipment (UE), a random access preamble for initiating a random access procedure; transmitting, to the UE, a random access response; receiving, from the UE, a first message for requesting system information (SI); transmitting, to the UE, physical downlink control channel (PDCCH) associated with a temporary cell radio network temporary identifier (TEMPORARY C-RNTI); and transmitting, to the UE, an acknowledgement for requesting the SI in response to identifying that a contention resolution is successful and a random access procedure is initiated for requesting the SI.

A cell radio network temporary identifier (C-RNTI) is set to a value of the TEMPORARY C-RNTI in response to identifying that the contention resolution is successful and the random access procedure is not initiated for requesting the SI.

The random access procedure is associated with contention-based random access.

A contention resolution is identified successful in response to identifying that UE Contention Resolution Identity in a MAC CE transmitted in a MAC PDU matches a CCCH SDU received in the first message.

In accordance with an aspect of the disclosure, a UE in a wireless communication system is provided. The UE includes a transceiver; and at least one processor coupled to the transceiver, the processor configured to control the transceiver to transmit, to a base station, a random access preamble for initiating a random access procedure and receive, from the base station, a random access response and transmit, to the base station, a first message for requesting system information (SI) and receive, from the base station, physical downlink control channel (PDCCH) associated with a temporary cell radio network temporary identifier (TEMPORARY C-RNTI); identify whether a contention resolution is successful; identify whether a random access procedure is initiated for requesting the SI; and indicate a reception of an acknowledgement for requesting the SI to upper layer in response to identifying that the contention resolution is successful and the random access procedure is initiated for requesting the SI.

The processor is further configured to set cell radio network temporary identifier (C-RNTI) to a value of the TEMPORARY C-RNTI in response to identifying that the contention resolution is successful and the random access procedure is not initiated for requesting the SI.

The random access procedure is associated with contention-based random access.

A contention resolution is identified successful in response to identifying that UE Contention Resolution Identity in a MAC CE received in a MAC PDU matches a CCCH SDU transmitted in the first message.

In accordance with an aspect of the present disclosure, a base station in a wireless communication system is provided. The base station includes a transceiver; and at least one processor coupled to the transceiver, the processor configured to control the transceiver to receive, from a user equipment (UE), a random access preamble for initiating a random access procedure and transmit, to the UE, a random access response and receive, from the UE, a first message for requesting system information (SI) and transmit, to the UE, physical downlink control channel (PDCCH) associated with a temporary cell radio network temporary identifier (TEMPORARY C-RNTI) and transmit, to the UE, an acknowledgement for requesting the SI in response to identifying that a contention resolution is successful and a random access procedure is initiated for requesting the SI.

A cell radio network temporary identifier (C-RNTI) is set to a value of the TEMPORARY C-RNTI in response to identifying that the contention resolution is successful and the random access procedure is not initiated for requesting the SI.

A contention resolution is identified successful in response to identifying that UE Contention Resolution Identity in a MAC CE transmitted in a MAC PDU matches a CCCH SDU received in the first message.

In accordance with an aspect of the disclosure, a method of a user equipment (UE) in a wireless communication system is provided. The method includes receiving, from a base station, physical downlink control channel (PDCCH) for bandwidth part (BWP) switching of a serving cell; identifying whether there is ongoing random access procedure associated with the serving cell; and performing BWP switching based on the PDCCH in response to identifying that there is no ongoing random access procedure.

The BWP switching is performed based on the PDCCH in response to identifying that there is ongoing random access procedure.

The ongoing random access procedure is stopped in response to identifying that the BWP switching is performed.

The PDCCH for BWP switching is ignored in response to identifying that there is ongoing random access procedure.

In accordance with an aspect of the disclosure, a method of a base station is provided. The method includes transmitting, to a user equipment (UE), bandwidth part (BWP) configuration information including information associated with an active bandwidth part (BWP) of a serving cell; and transmitting, to the UE, physical downlink control channel (PDCCH) for bandwidth part (BWP) switching of the serving cell, wherein the BWP switching is performed based on the PDCCH in response to identifying that there is no ongoing random access procedure associated with the serving cell.

The BWP switching is performed based on the PDCCH in response to identifying that there is ongoing random access procedure associated with the serving cell.

The ongoing random access procedure is stopped in response to identifying that the BWP switching is performed.

The PDCCH for BWP switching is ignored in response to identifying that there is ongoing random access procedure associated with the serving cell.

In accordance with an aspect of the disclosure, a UE in a wireless communication system is provided. The UE includes a transceiver; and at least one processor coupled to the transceiver, the processor configured to: control the transceiver to receive, from a base station, physical downlink control channel (PDCCH) for bandwidth part (BWP)

switching of a serving cell; identify whether there is ongoing random access procedure associated with the serving cell; and perform BWP switching based on the PDCCH in response to identifying that there is no ongoing random access procedure.

The BWP switching is performed based on the PDCCH in response to identifying that there is ongoing random access procedure.

The ongoing random access procedure is stopped in response to identifying that the BWP switching is performed.

The PDCCH for BWP switching is ignored in response to identifying that there is ongoing random access procedure.

In accordance with an aspect of the present disclosure, a base station in a wireless communication system is provided. The base station includes a transceiver; and at least one processor coupled to the transceiver, the processor configured to control the transceiver to: transmit, to a user equipment (UE), bandwidth part (BWP) configuration information including information associated with an active bandwidth part (BWP) of a serving cell; and transmit, to the UE, physical downlink control channel (PDCCH) for bandwidth part (BWP) switching of the serving cell, wherein the BWP switching is performed based on the PDCCH in response to identifying that there is no ongoing random access procedure associated with the serving cell.

The BWP switching is performed based on the PDCCH in response to identifying that there is ongoing random access procedure associated with the serving cell.

The DCI for the BWP switching is ignored in response to identifying that there is ongoing random access procedure associated with the serving cell.

In accordance with an aspect of the disclosure, a method of a user equipment (UE) in a wireless communication system is provided. The method includes receiving first information of a timer associated with a beam failure recovery and second information of maximum count value associated with beam failure instance; identifying a number of beam failure instances; identifying whether the number of beam failure instances is greater or equal to the second information; starting the timer associated with the beam failure recovery in response to identifying that the number of beam failure instances is greater or equal to the second information; transmitting a contention-free random access preamble for initiating a random access procedure for a beam failure recovery request; receiving physical downlink control channel (PDCCH) associated with a cell radio network temporary identifier (C-RNTI) of the UE; identifying whether the random access procedure is completed successfully; and stopping the timer in response to identifying that the random access procedure is completed successfully.

The first information and the second information is received by higher layer signaling.

The number of beam failure instances is set to zero in response to identifying that the random access procedure is completed successfully.

The beam failure recovery is identified completed in response to identifying that the random access procedure is completed successfully.

In accordance with an aspect of the disclosure, a method of a base station is provided. The method includes transmitting, to a user equipment (UE), first information of a timer associated with a beam failure recovery and second information of maximum count value associated with beam failure instance; receiving, from UE, a contention-free random access preamble for initiating a random access procedure for a beam failure recovery request; and transmitting, to the UE, physical downlink control channel (PDCCH) associated with a cell radio network temporary identifier (C-RNTI) of the UE, wherein the timer is started in response to identifying that a number of beam failure instances is greater or equal to the second information and the timer is stopped in response to identifying that the random access procedure is completed successfully.

The first information and the second information is transmitted by higher layer signaling The number of beam failure instances is set to zero in response to identifying that the random access procedure is completed successfully.

The beam failure recovery is identified completed in response to identifying that the random access procedure is completed successfully.

In accordance with an aspect of the disclosure, a UE in a wireless communication system is provided. The UE includes a transceiver; and at least one processor coupled to the transceiver, the processor configured to: control the transceiver to receive first information of a timer associated with a beam failure recovery and second information of maximum count value associated with beam failure instance; identify a number of beam failure instances; identify whether the number of beam failure instances is greater or equal to the second information; start the timer associated with the beam failure recovery in response to identifying that the number of beam failure instances is greater or equal to the second information; control the transceiver to transmit a contention-free random access preamble for initiating a random access procedure for a beam failure recovery request; control the transceiver to receive physical downlink control channel (PDCCH) associated with a cell radio network temporary identifier (C-RNTI) of the UE; identify whether the random access procedure is completed successfully; and stop the timer in response to identifying that the random access procedure is completed successfully.

The first information and the second information is received by higher layer signaling.

The number of beam failure instances is set to zero in response to identifying that the random access procedure is completed successfully.

The beam failure recovery is identified completed in response to identifying that the random access procedure is completed successfully.

In accordance with an aspect of the present disclosure, a base station in a wireless communication system is provided. The base station includes a transceiver; and at least one processor coupled to the transceiver, the processor configured to control the transceiver to: transmit, to a user equipment (UE), first information of a timer associated with a beam failure recovery and second information of maximum count value associated with beam failure instance; receive, from UE, a contention-free random access preamble for initiating a random access procedure for a beam failure recovery request; and transmit, to the UE, physical downlink control channel (PDCCH) associated with a cell radio network temporary identifier (C-RNTI) of the UE, wherein the timer is started in response to identifying that a number of beam failure instances is greater or equal to the second information and the timer is stopped in response to identifying that the random access procedure is completed successfully.

The number of beam failure instances is set to zero in response to identifying that the random access procedure is completed successfully.

The beam failure recovery is identified completed in response to identifying that the random access procedure is completed successfully.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
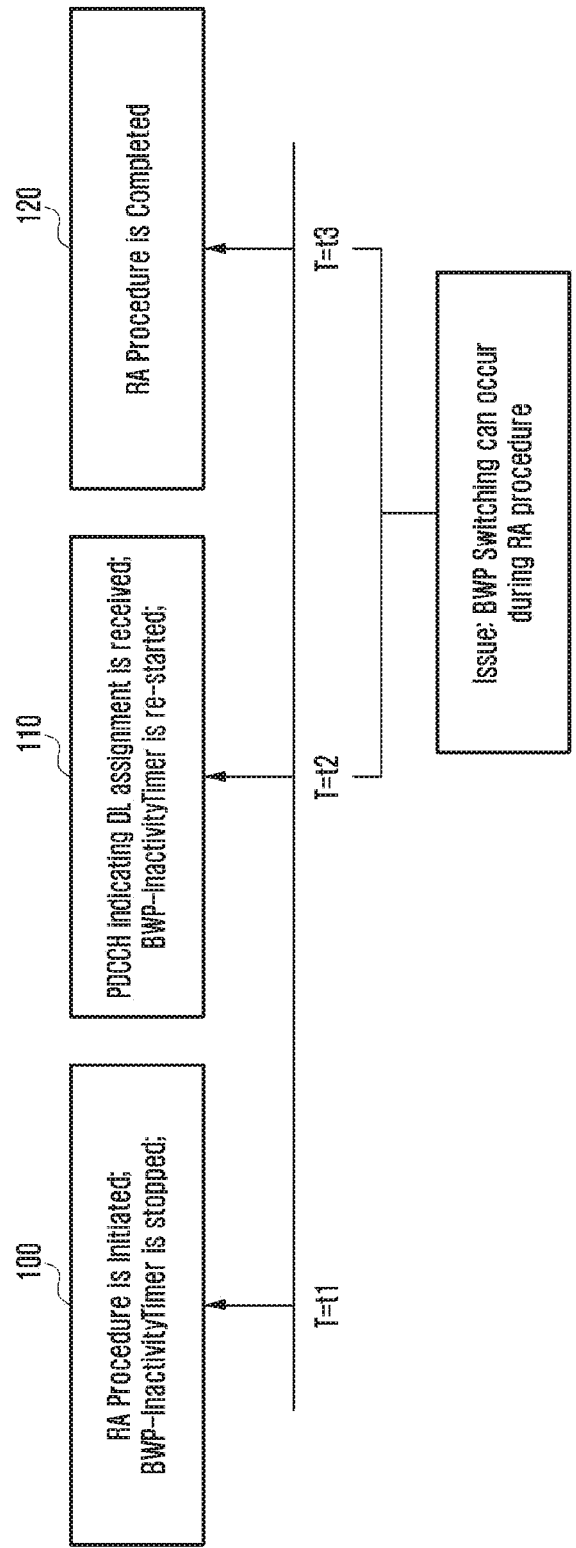
FIG. 1 illustrates an operation of the BWP-Inactivity-Timer associated with the random access procedure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are omitted for clarity and conciseness The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In each drawing, the same or similar components may be denoted by the same reference numerals.

Each block of the flow charts and combinations of the flow charts may be performed by computer program instructions. Because these computer program instructions may be mounted in processors for a general computer, a special computer, or other programmable data processing apparatuses, these instructions executed by the processors for the computer or the other programmable data processing apparatuses create means performing functions described in block(s) of the flow charts. Because these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Because the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate a module, a segment, and/or a code including one or more executable instructions for executing a specific logical function(s). Further, functions mentioned in the blocks occur regardless of a sequence in some alternative embodiments. For example, two blocks that are consecutively illustrated may be simultaneously performed in fact or be performed in a reverse sequence depending on corresponding functions sometimes.

Herein, the term "unit" may include software and/or hardware components, such as a field-programmable gate array (FPGA) and/or an application-specific integrated circuit (ASIC). However, the meaning of "unit" is not limited to software and/or hardware. For example, a unit may be configured to be in a storage medium that may be addressed and may also be configured to reproduce one or more processor. Accordingly, a "unit" may include components such as software components, object oriented software components, class components, task components, processors, functions, attributes, procedures, subroutines, segments of program code, drivers, firmware, microcode, circuit, data, database, data structures, tables, arrays, and variables.

Functions provided in the components and the "units" may be combined with a smaller number of components and/or "units" or may further separated into additional components and/or "units".

In addition, components and units may also be implemented to reproduce one or more CPUs within a device or a security multimedia card.

The terms as used in the disclosure are provided to describe specific embodiments, and do not limit the scope of other embodiments. It is to be understood that singular forms include plural forms unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as the contextual meanings of related technology. Unless otherwise defined, the terms should not be interpreted as ideally or excessively formal meanings. When needed, even the terms as defined in the disclosure may not be interpreted as excluding embodiments of the disclosure.

Herein, a base station performs resource allocation to a terminal. Examples of the base station may include an eNode B, a Node B, a wireless access unit, a base station controller, a node on a network, etc. Examples of the terminal may include a user equipment (UE), a mobile station (MS), a cellular phone, a smart phone, a computer, a multimedia system performing a communication function, etc.

Herein, a downlink (DL) is a radio transmission path of a signal from a base station to a UE and an uplink (UL) is a radio transmission path of a signal from the UE to the base station.

The embodiments of the disclosure may be applied to other communication systems having similar technical backgrounds or channel forms.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So, the fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few examples use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

The fifth generation wireless communication system (also referred as next generation radio or NR), supports stand-alone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either E-UTRA (i.e. if the node is an ng-eNB) or NR access (i.e. if the node is a gNB).

In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells.

In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In NR bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

When BA is configured, the UE only has to monitor PDCCH on the one active BWP i.e. it does not have to monitor PDCCH on the entire DL frequency of the serving cell. A serving cell is configured with one or more BWPs, and for a serving cell, there is always one active BWP at any point in time. The BWP switching for a serving cell is used to activate an inactive BWP and deactivate an active BWP at a time. The BWP switching is controlled by the PDCCH indicating a downlink assignment or an uplink grant, or by RRC signaling. Additionally, a BWP inactivity timer is used to switch the active DL BWP to the default DL BWP or initial DL BWP of a serving cell. One of the configured BWPs of a serving cell can be a default DL BWP and is indicated in BWP configuration received from gNB. Initial DL BWP is also signaled (either in system information or in dedicated signaling). One of the configured BWPs of a serving cell can be a first active DL BWP and is indicated in BWP configuration received from gNB. It is to be noted that BWP inactivity timer may or may not be configured in BWP configuration of each serving cell received from gNB. BWP inactivity timer if configured, is signaled independently for each serving cell. None or multiple serving cells may be configured with BWP inactivity timer.

In fifth generation wireless communication system UE may perform random access procedure for various reasons such as for UL timing alignment, requesting UL grant or for requesting on demand SI etc. During the random access procedure if BWP is switched (e.g. if BWP inactivity timer expires) then UE will have to abort the ongoing random access procedure and restart it again in newly activated BWP. This leads to increased delay in completing the random access procedure. So, a method to minimize the interruption is needed.

If BWP inactivity timer is configured for an activated serving cell, the MAC entity in UE shall for this activated Serving Cell performs the following operations according to the current procedure:
A) If the Default-DL-BWP is configured, and the active DL BWP is not the BWP indicated by the Default-DL-BWP; or if the Default-DL-BWP is not configured, and the active DL BWP is not the initial DL BWP:
  if a PDCCH addressed to C-RNTI or CS-RNTI indicating downlink assignment or uplink grant is received on the active BWP; or if a MAC PDU is transmitted in a configured uplink grant or received in a configured downlink assignment;
    start or restart the BWP-InactivityTimer associated with the active DL BWP;
B) If a PDCCH for BWP switching is received, and the MAC entity switches the active BWP:
  if the defaultDownlinkBWP-Id is configured, and the MAC entity switches to the BWP which is not indicated by the defaultDownlinkBWP-Id; or if the defaultDownlinkBWP-Id is not configured, and the MAC entity switches to the BWP which is not the initialDownlinkBWP:
    start or restart the bwp-InactivityTimer associated with the active DL BWP.
C) if random access procedure is initiated on this serving cell:
    stop the BWP-InactivityTimer;
D) if BWP-InactivityTimer associated with the active DL BWP expires:
  if the Default-DL-BWP is configured, perform BWP switching to a BWP indicated by the Default-DL-BWP. Otherwise, perform BWP switching to the initial DL BWP.

There are several issues with operation (as described above) of BWP inactivity timer. If random access (RA) procedure is initiated, UE stops the BWP-InactivityTimer according to current procedure. UE stops the BWP-InactivityTimer associated with active DL BWP of activated serving cell for which the random access is initiated. If the random access is initiated for PCell, BWP-InactivityTimer associated with active DL BWP of PCell is stopped. If the random access is initiated for SCell, BWP-InactivityTimer associated with active DL BWP of SCell is stopped. In case of random access procedure on SCell (other than PSCell), only PRACH preamble is transmitted on SCell. UE receives the RAR on SpCell. The active DL BWP on SpCell can switch while random access procedure is ongoing. This will lead to interruption as random access procedure needs to be stopped and restarted after the BWP switching.

FIG. 1 illustrates an operation of the BWP-InactivityTimer associated with the random access procedure according to an embodiment of the disclosure.

Referring to FIG. 1, random access procedure is initiated at T=t1 (100) and completes at T=t3 (120). While random access procedure is ongoing, UE may receive a PDCCH with downlink assignment (for e.g. UE may receive a PDCCH with downlink assignment for RAR). In this scenario, UE stops the BWP-InactivityTimer at T=t1 (100) in order to prevent BWP switching during random access procedure. However, BWP switching cannot be avoided as UE restarts BWP-InactivityTimer again at T=t2 (110) during the random access procedure. This will also lead to interruption as random access procedure needs to be stopped and restarted after the BWP switching.

In the invention, for Dual/multi Connectivity operation the term Special Cell (SpCell) refers to the primary cell (PCell) of the Master Cell Group (MCG) or the primary secondary cell (PSCell) of the Secondary Cell Group (SCG) depending on if the MAC entity is associated to the MCG or the SCG, respectively. There is one MAC entity per Cell Group (CG) in UE. Otherwise the term Special Cell refers to the PCell. In the proposed operation if the SCell on which random access procedure is initiated belongs to MCG then term SpCell refers to PCell. If the SCell on which random access procedure is initiated belongs to SCG then term SpCell refers to PSCell.

In one method of the invention it is proposed to handle BWP Inactivity timer upon initiation of random access procedure according to the type of serving cell on which random access procedure is Initiated.

The random access procedure is initiated by a PDCCH order from gNB, by the MAC entity itself, by beam failure indication from lower layer, or by RRC. For example, the random access procedure is initiated or performed for the following events related to the PCell:

Initial access from RRC IDLE;
RRC Connection Re-establishment procedure;
Handover;
DL data arrival during RRC_CONNECTED requiring random access procedure:
    E.g. when UL synchronisation status is "non-synchronised".
UL data arrival during RRC_CONNECTED requiring random access procedure:
    E.g. when UL synchronisation status is "non-synchronised" or there are no PUCCH resources for SR available.
For positioning purpose during RRC_CONNECTED requiring random access procedure;
    E.g. when timing advance is needed for UE positioning.
Transition from RRC INACTIVE;
Request for Other SI The random access procedure is also performed on a SCell to establish time alignment for the corresponding sTAG. In DC, the random access procedure is also performed on at least PSCell upon SCG addition/modification, if instructed, or upon DL/UL data arrival during RRC_CONNECTED requiring random access procedure. The UE initiated random access procedure is performed only on PSCell for SCG.

According to current procedure MAC entity in UE perform the following operation for each activated serving cell configured with BWP inactivity timer:

If the Default-DL-BWP is configured, and the active DL BWP is not the BWP indicated by the Default-DL-BWP; or if the Default-DL-BWP is not configured, and the active DL BWP is not the initial BWP:

If random access procedure is initiated, UE stops the BWP-InactivityTimer. UE stops the BWP-InactivityTimer associated with active DL BWP of activated serving cell for which the random access is initiated. This means that if the random access is initiated for PCell, BWP-InactivityTimer associated with active DL BWP of PCell is stopped. If the random access is initiated for PSCell, BWP-InactivityTimer associated with active DL BWP of PSCell is stopped. If the random access is initiated for SCell (i.e. secondary cell other than PSCell), BWP-InactivityTimer associated with active DL BWP of SCell is stopped.

In case of random access procedure on SCell (other than PS Cell), only PRACH preamble is transmitted on SCell. UE receives the RAR on SpCell. The active DL BWP on SpCell can switch while random access procedure is ongoing. This will lead to interruption as random access procedure needs to be stopped and restarted after BWP switching.

In order to resolve the issue, in an embodiment of the invention we propose the following UE operation:

Step 1: random access procedure is initiated on a serving cell.

Step 2: If the serving cell on or for which random access procedure is initiated is a SCell (i.e. secondary cell other than PSCell), UE performs operation described in step 3 and step 4. Otherwise, UE performs operation described in step 3.

Figure 2:
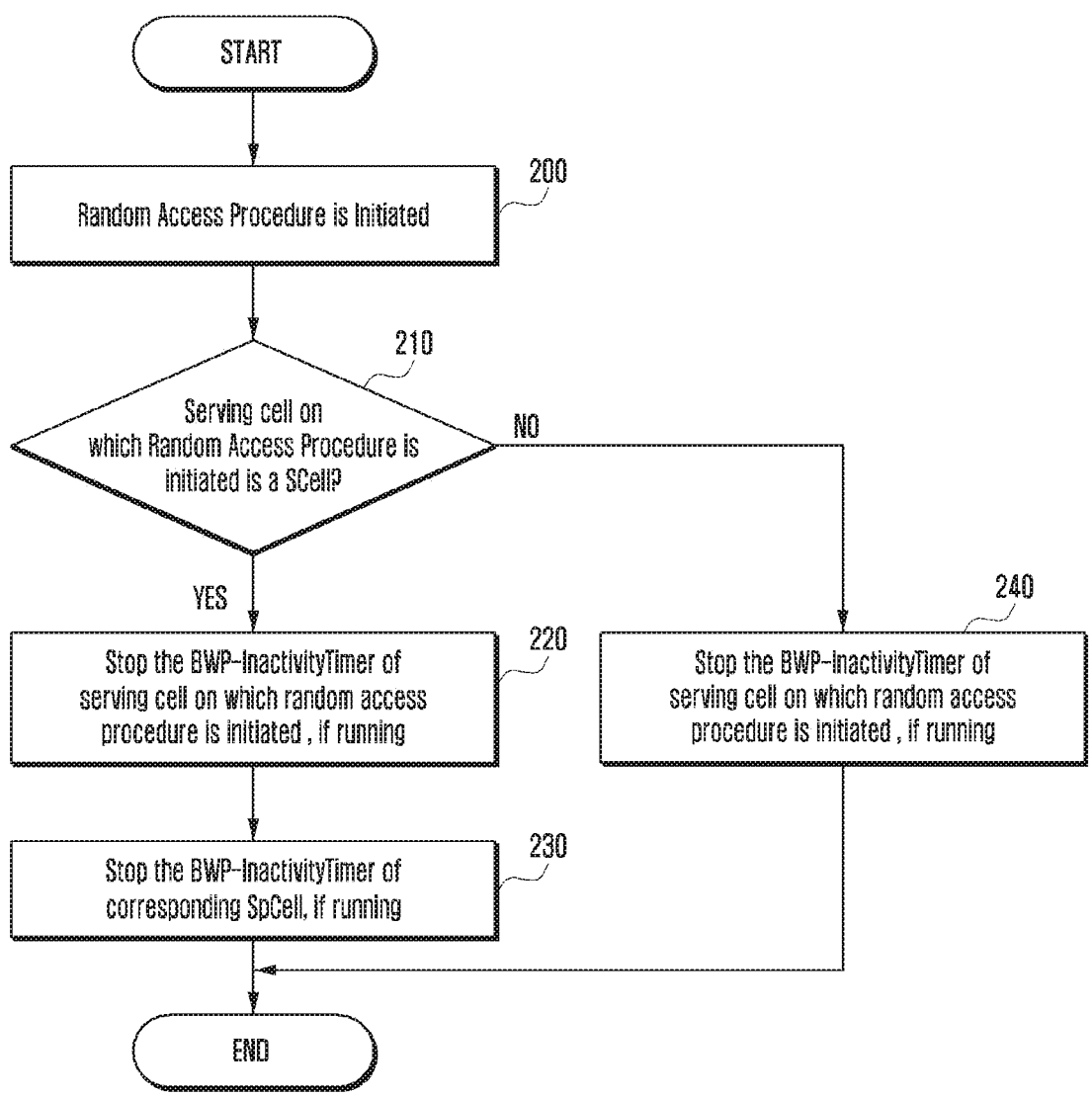
FIG. 2 illustrates UE operation in one embodiment of the proposed invention to handle BWP-InactivityTimer when UE is configured with multiple serving cells and random access procedure is initiated according to an embodiment of the disclosure.

Step 3: For the serving cell on or for which random access procedure is initiated, UE performs the following:

A. if BWP inactivity timer is configured and if the Default-DL-BWP is configured, and the active DL BWP is not the BWP indicated by the Default-DL-BWP, MAC entity stops BWP-InactivityTimer (i.e. MAC entity stops BWP-InactivityTimer of this serving cell or MAC entity stops BWP-InactivityTimer associated with active DL BWP of this serving cell);
OR
B. if BWP inactivity timer is configured and if the Default-DL-BWP is not configured, and the active DL BWP is not the initial DL BWP, MAC entity stops BWP-InactivityTimer (i.e. MAC entity stops BWP-InactivityTimer of this serving cell or MAC entity stops BWP-InactivityTimer associated with active DL BWP of this serving cell);

Step 4: For the special serving cell (SpCell) UE performs the following:

A. if BWP inactivity timer is configured and if the Default-DL-BWP is configured, and the active DL BWP is not the BWP indicated by the Default-DL-BWP, MAC entity stops BWP-InactivityTimer (i.e. MAC entity stops BWP-InactivityTimer of SpCell or MAC entity stops BWP-InactivityTimer associated with active DL BWP of SpCell);
OR
B. if BWP inactivity timer is configured and if the Default-DL-BWP is not configured, and the active DL BWP is not the initial BWP, MAC entity stops BWP-InactivityTimer (i.e. MAC entity stops BWP-InactivityTimer of SpCell or MAC entity stops BWP-InactivityTimer associated with active DL BWP of SpCell);

FIG. 2 illustrates UE operation in one embodiment of the proposed invention to handle BWP-InactivityTimer upon initiation of random access procedure according to the type of serving cell on which random access procedure is initiated according to an embodiment of the disclosure.

Referring to FIG. 2, the UE operation includes the following steps/operations.

In operation 200, random access procedure is initiated

In operation 210, if the serving cell on or for which random access procedure is initiated is a SCell (i.e. secondary cell other than PSCell), UE performs operation described in operation 220 and operation 230. Otherwise, UE performs operation described in operation 240 which is the same as the operation 220.

In operation 220, for the serving cell on or for which random access procedure is initiated, UE performs the following:

A. if BWP inactivity timer is running for this serving cell, stop the BWP-InactivityTimer for this serving cell; In alternate embodiment, if BWP inactivity timer is running for this serving cell, stop the BWP-InactivityTimer associated with active DL BWP of this serving cell.

In operation 230, for the special serving cell (SpCell) UE performs the following:

B. if BWP inactivity timer is running for SpCell, stop the BWP-InactivityTimer of SpCell; In alternate embodiment, if BWP inactivity timer is running for SpCell, stop the BWP-InactivityTimer associated with active DL BWP of SpCell.

Figure 3:
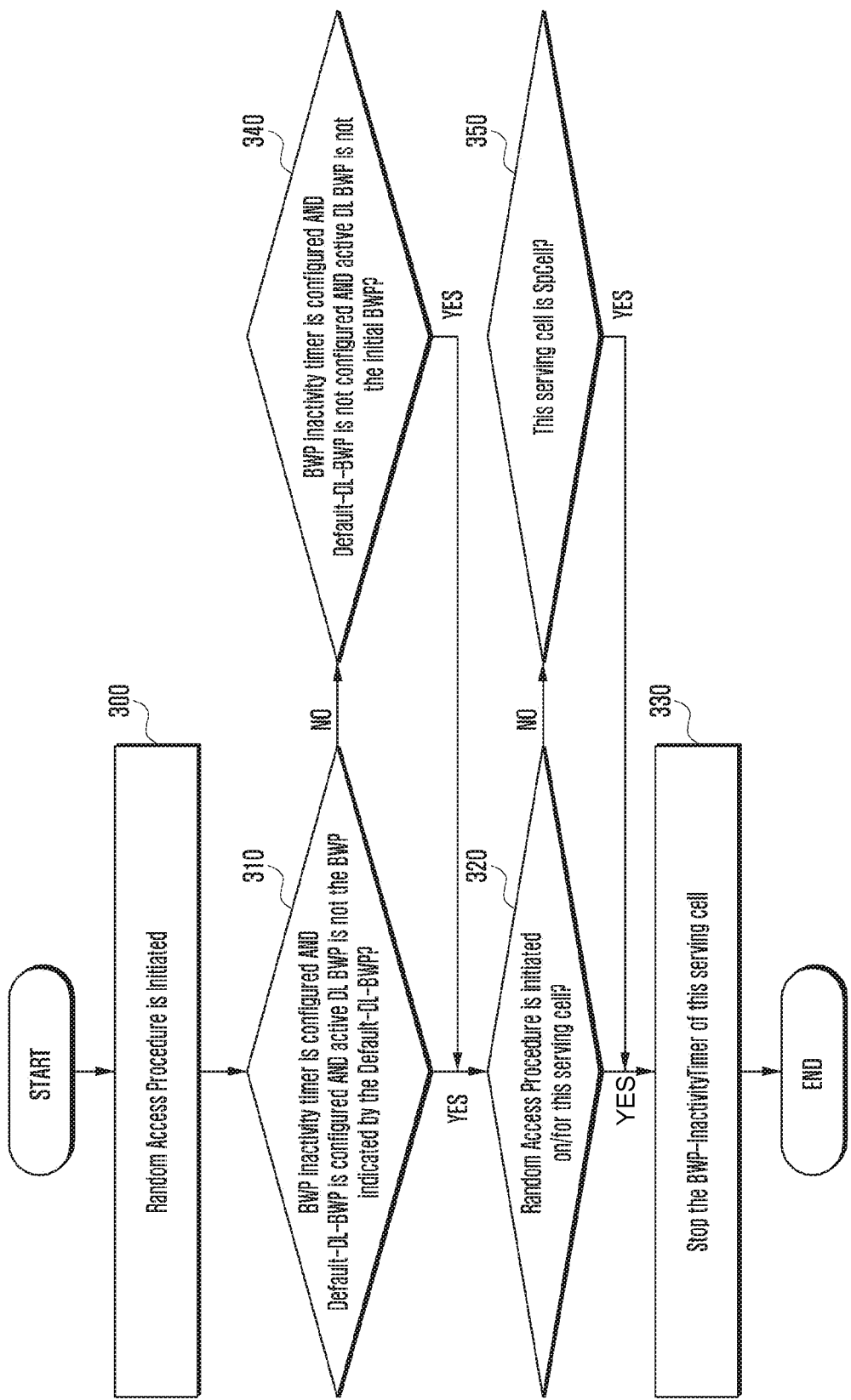
FIG. 3 illustrates UE operation in another embodiment of the proposed invention to handle BWP-InactivityTimer when UE is configured with multiple serving cells and random access procedure is initiated according to an embodiment of the disclosure.

FIG. 3 illustrates UE operation in another embodiment of the proposed invention to handle BWP-InactivityTimer upon initiation of random access procedure according to the type of serving cell on which random access procedure is initiated according to an embodiment of the disclosure. In an embodiment, upon initiation of random access procedure this operation is performed by MAC entity in UE for each activated serving cell which are configured with BWP inactivity timer. In another embodiment, upon initiation of random access procedure this operation is performed by MAC entity in UE for following serving cells:
 a) for serving cell on which random access procedure is initiated if BWP inactivity timer is configured on this serving cell.
 b) for SpCell if the serving cell on which random access procedure is initiated is not SpCell and if BWP inactivity timer is configured for SpCell.

Referring to FIG. 3, the UE operation includes the following steps/operations.
 1> If the Default-DL-BWP is configured, and the active DL BWP is not the BWP indicated by the Default-DL-BWP; operation 300 or
 1> if the Default-DL-BWP is not configured, and the active DL BWP is not the initial BWP operation 330:
  2> if random access procedure is initiated on or for this serving cell operation 310:
   3> stop the BWP-InactivityTimer of this serving cell operation 320; In alternate embodiment, if BWP inactivity timer is running for this serving cell, stop the BWP-InactivityTimer associated with active DL BWP of this serving cell.
  2> else if random access procedure is initiated on or for another serving cell and if this serving cell is SpCell operation 340:
   3> stop the BWP-InactivityTimer of this serving cell operation 320; In alternate embodiment, if BWP inactivity timer is running for this serving cell, stop the BWP-InactivityTimer associated with active DL BWP of this serving cell.

Figure 4:
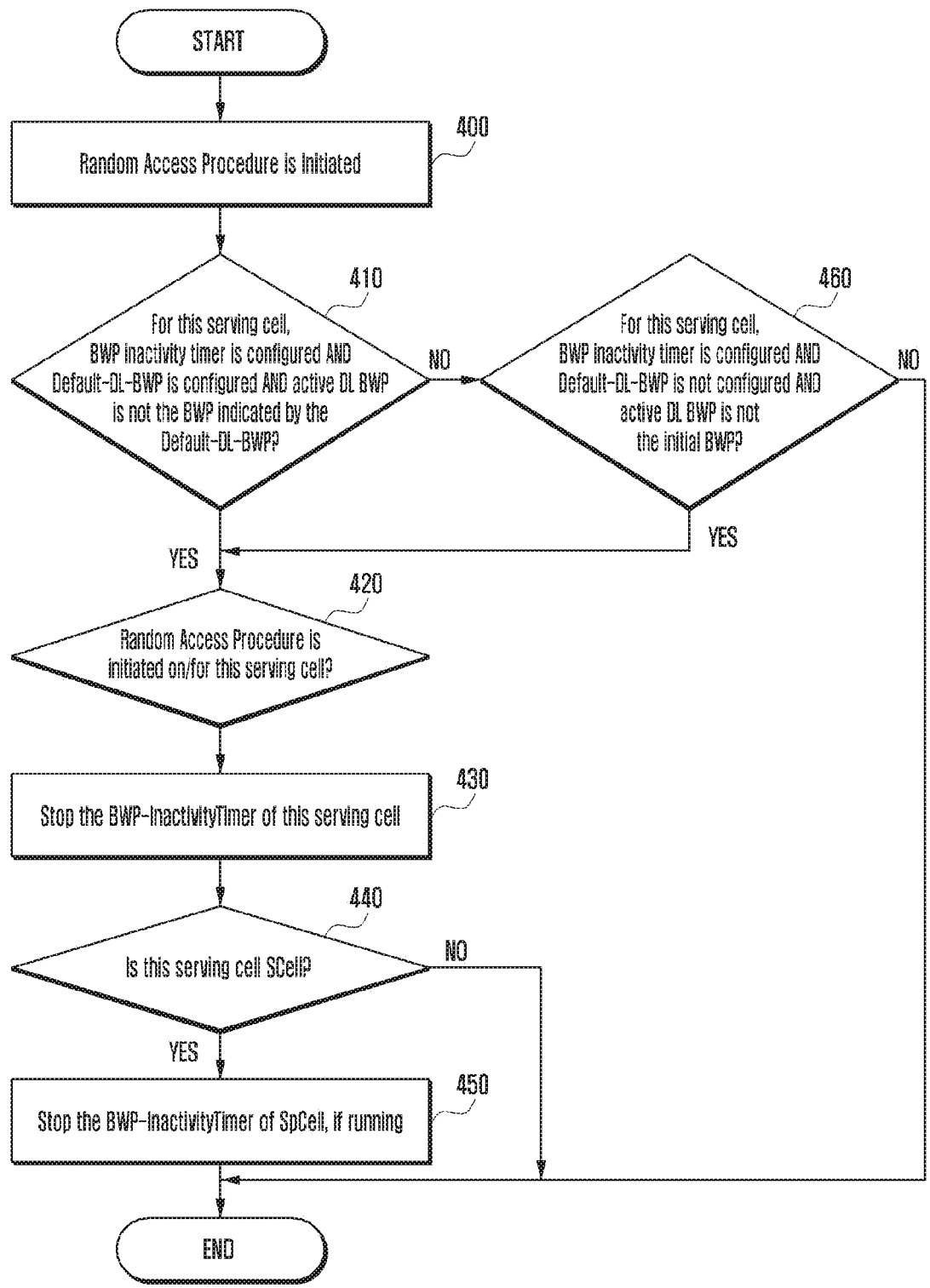
FIG. 4 illustrates UE operation in another embodiment of the proposed invention to handle BWP-InactivityTimer when UE is configured with multiple serving cells and random access procedure is initiated according to an embodiment of the disclosure.

FIG. 4 illustrates UE operation in another embodiment of the proposed invention to handle BWP-InactivityTimer upon initiation of random access procedure according to the type of serving cell on which random access procedure is initiated according to an embodiment of the disclosure. Referring to FIG. 4, upon initiation of random access procedure this operation is performed by MAC entity in UE for serving cell on which random access procedure is initiated.

In operation 400, random access procedure is initiated on a serving cell.

For this serving cell the BWP inactivity timer is operated by the UE as follows:
 1> If the Default-DL-BWP is configured, and the active DL BWP is not the BWP indicated by the Default-DL-BWP (operation 410); or
 1> if the Default-DL-BWP is not configured, and the active DL BWP is not the initial BWP (operation 450):
  2> stop the BWP-InactivityTimer of this serving cell, if running (operation 420); In alternate embodiment, if BWP inactivity timer is running, stop the BWP-InactivityTimer associated with active DL BWP of this serving cell.
  2> if this serving cell is SCell (i.e. secondary cell other than PSCell) (operation 430):
   3> stop the BWP-InactivityTimer of SpCell, if running (operation 440); In alternate embodiment, if BWP inactivity timer is running, stop the BWP-InactivityTimer associated with active DL BWP of SpCell.

Figure 5:
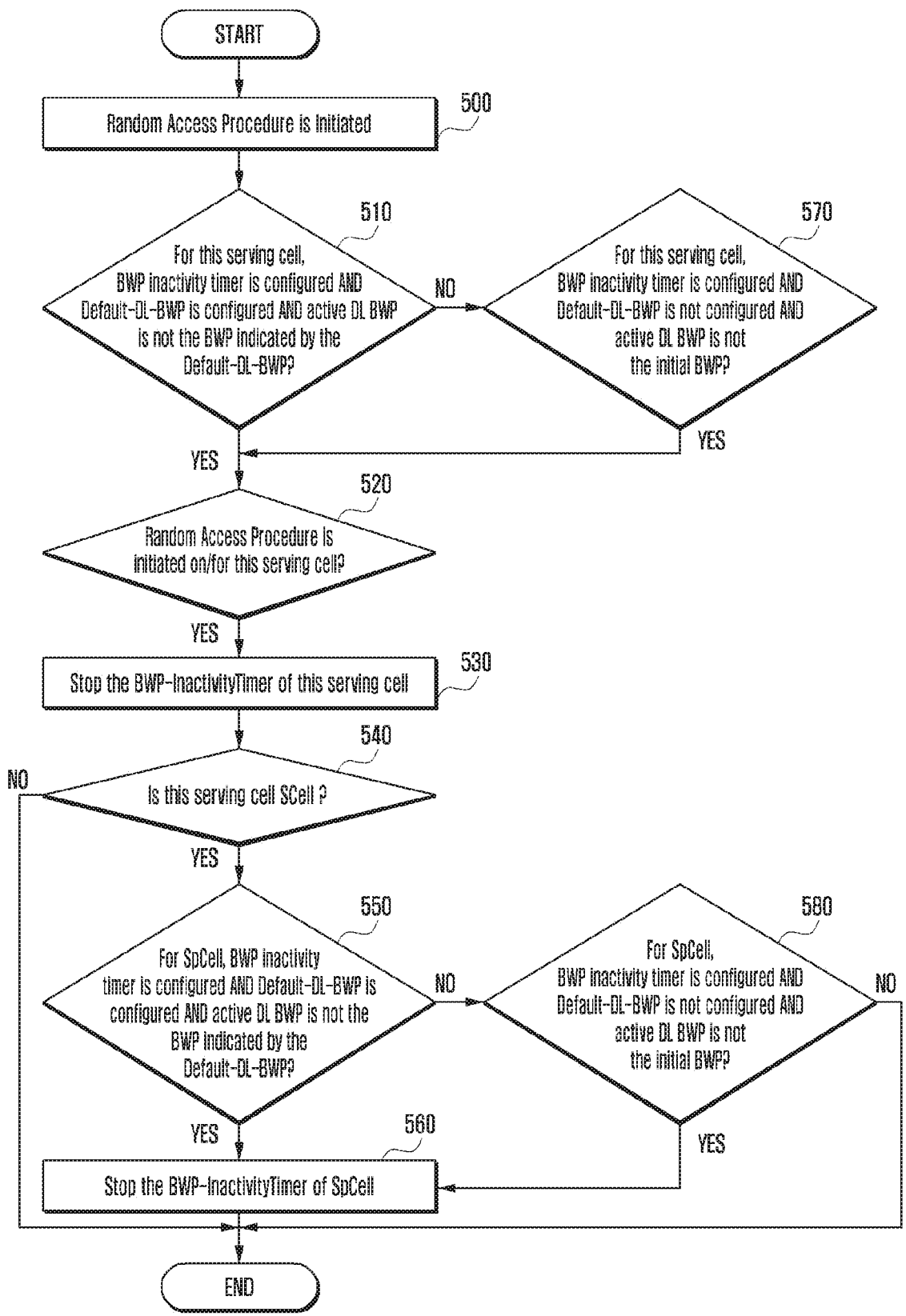
FIG. 5 illustrates UE operation in another embodiment of the proposed disclosure to handle BWP-InactivityTimer when UE is configured with multiple serving cells and random access procedure is initiated according to an embodiment of the disclosure.

FIG. 5 illustrates UE operation in another embodiment of the proposed invention to handle BWP-InactivityTimerupon initiation of random access procedure according to the type of serving cell on which random access procedure is initiated according to an embodiment of the disclosure. Referring to FIG. 5, upon initiation of random access procedure this operation is performed by MAC entity in UE for serving cell on which random access procedure is initiated.

In operation 500, random access procedure is initiated on a serving cell.
 1> If the Default-DL-BWP is configured, and the active DL BWP is not the BWP indicated by the Default-DL-BWP (operation 510); or
 1> if the Default-DL-BWP is not configured, and the active DL BWP is not the initial BWP (operation 560):
  2> stop the BWP-InactivityTimer of this serving cell (operation 520); In alternate embodiment, if BWP inactivity timer is running, stop the BWP-InactivityTimer associated with active DL BWP of this serving cell.
  2> if this serving cell is SCell (i.e. secondary cell other than PSCell) (operation 530):
   3> if BWP inactivity timer is configured for the SpCell:
    4> For the SpCell, If the Default-DL-BWP is configured, and the active DL BWP is not the BWP indicated by the Default DL-BWP (operation 540); or
    4> For the SpCell, if the Default-DL-BWP is not configured, and the active DL BWP is not the initial BWP (operation 570);
     5> stop the BWP-InactivityTimer of SpCell (operation 550); In alternate embodiment, if BWP inactivity timer is running, stop the BWP-InactivityTimer associated with active DL BWP of SpCell.

In the above operation expression 'random access procedure is initiated on or for a serving cell' means the random access procedure in which PRACH preamble is transmitted on the said serving cell.

Alternatively, it is proposed to handle BWP Inactivity timer upon initiation of random access procedure according to the type of serving cell on which random access procedure is Initiated.

According to current procedure, MAC entity in UE perform the following operation for each activated serving cell configured with BWP inactivity timer:

If the Default-DL-BWP is configured, and the active DL BWP is not the BWP indicated by the Default-DL-BWP; or if the Default-DL-BWP is not configured, and the active DL BWP is not the initial BWP:

If random access procedure is initiated, UE stops the BWP-InactivityTimer. UE stops the BWP-InactivityTimer associated with active DL BWP of activated serving cell for which the random access is initiated.

This means that if the random access is initiated for PCell, BWP-InactivityTimer associated with active DL BWP of PCell is stopped. If the random access is initiated for PSCell, BWP-InactivityTimer associated with active DL BWP of PSCell is stopped. If the random access is initiated for SCell (other than PSCell), BWP-InactivityTimer associated with active DL BWP of SCell is stopped.

In case of random access procedure on SCell (other than PSCell), only PRACH preamble is transmitted on SCell. UE receives the RAR on SpCell. The active DL BWP on SpCell can switch while random access procedure is ongoing. This will lead to interruption as random access procedure needs to be stopped and restarted after BWP switching.

In order to resolve the issue, we propose the following UE operation:

Step 1: random access procedure is initiated.

Step 2: If the serving cell on or for which random access procedure is initiated is a SCell (i.e. secondary cell other than PSCell), UE performs operation described in step 3 and step 4. Otherwise, UE performs operation described in step 3.

Step 3: For the serving cell on or for which random access procedure is initiated, UE performs the following:
  A. if BWP inactivity timer is configured and if the Default-DL-BWP is configured, and the active DL BWP is not the BWP indicated by the Default-DL-BWP, MAC entity stops BWP-InactivityTimer; (i.e. MAC entity stops BWP-InactivityTimer of this serving cell or MAC entity stops BWP-InactivityTimer associated with active DL BWP of this serving cell);
  OR
  B. if serving cell is PCell and if BWP inactivity timer is configured and if the Default-DL-BWP is not configured, and the active DL BWP is not the initial BWP, MAC entity stops BWP-InactivityTimer (i.e. MAC entity stops BWP-InactivityTimer of this serving cell or MAC entity stops BWP-InactivityTimer associated with active DL BWP of this serving cell);
  OR
  C. if serving cell is SCell and if BWP inactivity timer is configured and if the Default-DL-BWP is not configured, and the active DL BWP is not the first active BWP, MAC entity stops BWP-InactivityTimer (i.e. MAC entity stops BWP-InactivityTimer of this serving cell or MAC entity stops BWP-InactivityTimer associated with active DL BWP of this serving cell); (Note, this condition may be absent in an embodiment of the proposed invention)

Step 4: For the special serving cell (SpCell) UE performs the following:
  A. if BWP inactivity timer is configured and if the Default-DL-BWP is configured, and the active DL BWP is not the BWP indicated by the Default-DL-BWP, MAC entity stops BWP-InactivityTimer (i.e. MAC entity stops BWP-InactivityTimer of this serving cell or MAC entity stops BWP-InactivityTimer associated with active DL BWP of this serving cell);
  OR
  B. if serving cell is PCell and if BWP inactivity timer is configured and if the Default-DL-BWP is not configured, and the active DL BWP is not the initial BWP, MAC entity stops BWP-InactivityTimer (i.e. MAC entity stops BWP-InactivityTimer of this serving cell or MAC entity stops BWP-InactivityTimer associated with active DL BWP of this serving cell);
  OR
  C. if serving cell is SCell and if BWP inactivity timer is configured and if the Default-DL-BWP is not configured, and the active DL BWP is not the first active BWP, MAC entity stops BWP-InactivityTimer (i.e. MAC entity stops BWP-InactivityTimer of this serving cell or MAC entity stops BWP-InactivityTimer associated with active DL BWP of this serving cell); (Note, this condition may be absent in an embodiment of the proposed invention).

In another embodiment of the proposed invention, upon initiation of random access procedure MAC entity in UE perform the following operation. In an embodiment, upon initiation of random access procedure this operation is performed by MAC entity in UE for each activated serving cell which are configured with BWP inactivity timer. In another embodiment, upon initiation of random access procedure this operation is performed by MAC entity in UE for following serving cells:
  a) for serving cell on which random access procedure is initiated if BWP inactivity timer is configured on this serving cell.
  b) for SpCell if the serving cell on which random access procedure is initiated is not SpCell and if BWP inactivity timer is configured for SpCell:
    1> If the Default-DL-BWP is configured, and the active DL BWP is not the BWP indicated by the Default-DL-BWP; or
    1> if this serving cell is PCell and if the Default-DL-BWP is not configured, and the active DL BWP is not the initial BWP; or
    1> if this serving cell is SCell and if the Default-DL-BWP is not configured, and the active DL BWP is not the first active BWP:
      2> if random access procedure is initiated on or for this serving cell:
        3> stop the BWP-InactivityTimer associated with active DL BWP of this serving cell; In alternate embodiment, if BWP inactivity timer is running, stop the BWP-InactivityTimer of this serving cell.
      2> else if random access procedure is initiated on or for another serving cell and if this serving cell is SpCell:
        3> stop the BWP-InactivityTimer associated with active DL BWP of this serving cell; In alternate embodiment, if BWP inactivity timer is running, stop the BWP-InactivityTimer associated with active DL BWP of this serving cell.

In another embodiment of the proposed invention, upon initiation of random access procedure on a serving cell the MAC entity in UE perform the following operation for this serving cell:
  1> If the Default-DL-BWP is configured, and the active DL BWP is not the BWP indicated by the Default-DL-BWP; or
  1> if the Default-DL-BWP is not configured, and the active DL BWP is not the initial BWP; or
  1> if this serving cell is SCell and if the Default-DL-BWP is not configured, and the active DL BWP is not the first active BWP:
    2> stop the BWP-InactivityTimer associated with active DL BWP of this serving cell; In alternate embodiment, if BWP inactivity timer is running, stop the BWP-InactivityTimer of this serving cell.
    2> if this serving cell is SCell (i.e. secondary cell other than PSCell):
      3> stop the BWP-InactivityTimer associated with active DL BWP of SpCell, if running; In alternate embodiment, if BWP inactivity timer is running, stop the BWP-InactivityTimer of SpCell, if running.

In another embodiment of the proposed invention, upon initiation of random access procedure on a serving cell the MAC entity in UE perform the following operation for this serving cell:

1> If the Default-DL-BWP is configured, and the active DL BWP is not the BWP indicated by the Default-DL-BWP; or
1> if the Default-DL-BWP is not configured, and the active DL BWP is not the initial BWP; or
1> if this serving cell is SCell and if the Default-DL-BWP is not configured, and the active DL BWP is not the first active BWP:
   2> stop the BWP-InactivityTimer associated with active DL BWP of this serving cell; In alternate embodiment, if BWP inactivity timer is running, stop the BWP-InactivityTimer of this serving cell.
   2> if this serving cell is SCell (i.e. secondary cell other than PSCell):
      3> if BWP inactivity timer is configured for the SpCell:
         4> For the SpCell, If the Default-DL-BWP is configured, and the active DL BWP is not the BWP indicated by the Default-DL-BWP; or
         4> For the SpCell, if the Default-DL-BWP is not configured, and the active DL BWP is not the initial BWP;
         5> stop the BWP-InactivityTimer associated with active DL BWP of SpCell; In alternate embodiment, if BWP inactivity timer is running, stop the BWP-InactivityTimer of SpCell.

In the above operation expression 'random access procedure is initiated on or for a serving cell' means the random access procedure in which PRACH preamble is transmitted on the said serving cell. The first active BWP amongst the configured BWP is indicated in BWP configuration received from gNB.

In one method of the invention it is proposed to handle BWP Inactivity timer upon completion of random access procedure.

Some examples of conditions when random access procedure is considered successfully completed are as follows:

1. After transmitting the contention free Random Access Preamble for beam failure recovery request, UE receives PDCCH transmission addressed to the C-RNTI in bfr-response window.
2. After transmitting the contention free Random Access Preamble for SI request if a downlink assignment has been received on the PDCCH for the RA-RNTI and the received TB is successfully decoded and if the Random Access Response contains a Random Access Preamble identifier corresponding to the transmitted preamble and if the Random Access Response includes RAPID only.
3. After transmitting the contention free Random Access Preamble if a downlink assignment has been received on the PDCCH for the RA-RNTI and the received TB is successfully decoded and if the Random Access Response contains a Random Access Preamble identifier corresponding to the transmitted preamble and if the Random Access Response does not include RAPID only.
4. After transmitting Msg3, if PDCCH is received and if the C-RNTI MAC CE was included in Msg3 and if the random access procedure was initiated by the MAC sublayer itself or by the RRC sublayer and the PDCCH transmission is addressed to the C-RNTI and contains an UL grant for a new transmission.
5. After transmitting Msg3, if PDCCH is received and if the C-RNTI MAC CE was included in Msg3 and if the random access procedure was initiated by a PDCCH order and the PDCCH transmission is addressed to the C-RNTI.
6. After transmitting Msg3, if PDCCH is received and if the C-RNTI MAC CE was included in Msg3 and if the random access procedure was initiated for beam failure recovery and the PDCCH transmission is addressed to the C-RNTI.
7. After transmitting Msg3, if PDCCH is received and if the CCCH SDU was included in Msg3 and the PDCCH transmission is addressed to its TEMPORARY_C-RNTI and if the MAC PDU is successfully decoded and if the MAC PDU contains a UE Contention Resolution Identity MAC CE; and if the UE Contention Resolution Identity in the MAC CE matches the CCCH SDU transmitted in Msg3:

In the one embodiment of the proposed invention, UE operation is as follows:

Step 1: random access procedure initiated on or for a serving cell is successfully completed Step 2: If the serving cell on which random access procedure (which was successfully completed) was initiated is a SCell (i.e. secondary cell other than PSCell), UE performs operation described in step 3 and step 4. Otherwise, UE performs operation described in step 3.

Step 3: For the serving cell on which random access procedure (which was successfully completed) was initiated, UE performs the following:

A. if BWP inactivity timer is configured and if the Default-DL-BWP is configured, and the active DL BWP is not the BWP indicated by the Default-DL-BWP, MAC entity starts BWP-InactivityTimer (i.e. start the BWP-InactivityTimer associated with active DL BWP of this serving cell or start the BWP-InactivityTimer of this serving cell);

OR

B. if BWP inactivity timer is configured and if the Default-DL-BWP is not configured, and the active DL BWP is not the initial DL BWP, MAC entity starts BWP-InactivityTimer (i.e. start the BWP-InactivityTimer associated with active DL BWP of this serving cell or start the BWP-InactivityTimer of this serving cell);

Step 4: For the special serving cell (SpCell) UE performs the following:

C. if BWP inactivity timer is configured and if the Default-DL-BWP is configured, and the active DL BWP is not the BWP indicated by the Default-DL-BWP, MAC entity starts BWP-InactivityTimer (i.e. start the BWP-InactivityTimer associated with active DL BWP of this serving cell or start the BWP-InactivityTimer of this serving cell);

OR

D. if BWP inactivity timer is configured and if the Default-DL-BWP is not configured, and the active DL BWP is not the initial DL BWP, MAC entity starts BWP-InactivityTimer (i.e. start the BWP-InactivityTimer associated with active DL BWP of this serving cell or start the BWP-InactivityTimer of this serving cell);

Note: For Dual/multi Connectivity operation the term Special Cell (SpCell) refers to the PCell of the MCG or the PSCell of the SCG depending on if the MAC entity is associated to the MCG or the SCG, respectively. Otherwise the term Special Cell refers to the Pcell).

Figure 6:
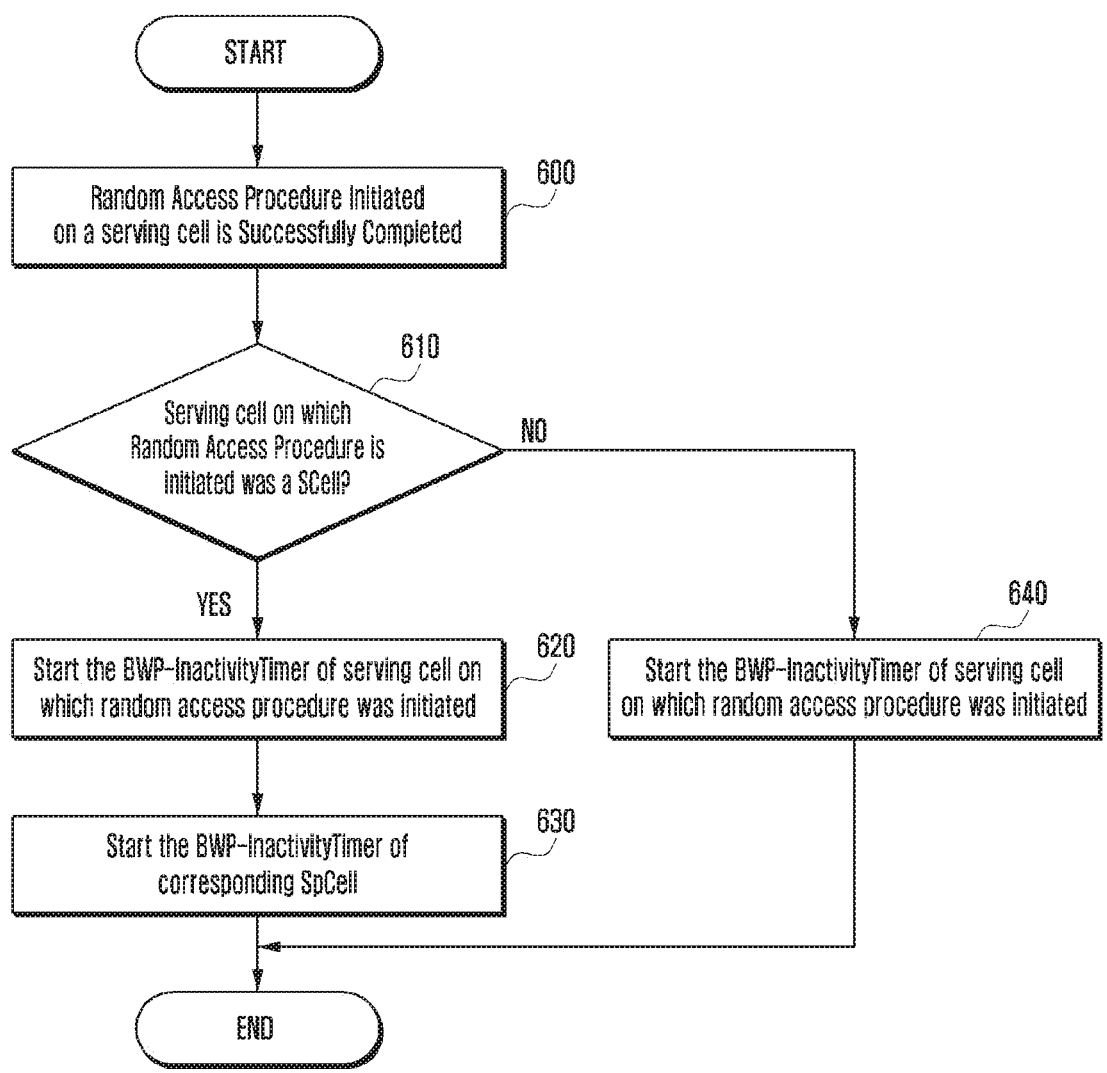
FIG. 6 illustrates UE operation in one embodiment of the proposed invention to handle BWP-InactivityTimer when UE is configured with multiple serving cells and random access procedure is completed according to an embodiment of the disclosure.

FIG. 6 illustrates UE operation in one embodiment of the proposed invention to handle BWP-InactivityTimer upon completion of random access procedure according to an embodiment of the disclosure.

Referring to FIG. 6, in operation 600, random access procedure initiated is successfully completed.

In operation 610, if the serving cell on which random access procedure (which was successfully completed) was initiated is a SCell (i.e. secondary cell other than PSCell), UE performs operation described in operation 620 and operation 630. Otherwise, UE performs operation described in operation 640 which is the same as the operation 620.

In operation 620, for the serving cell on or for which random access procedure (which was successfully completed) was initiated, UE performs the following:
  A. start the BWP-InactivityTimer for this serving cell; In alternate embodiment, start the BWP-InactivityTimer associated with active DL BWP of this serving cell.

In operation 630, for the special serving cell (SpCell) UE performs the following:
  B. Start the BWP-InactivityTimer of SpCell; In alternate embodiment, start the BWP-InactivityTimer associated with active DL BWP of SpCell.

Figure 7:
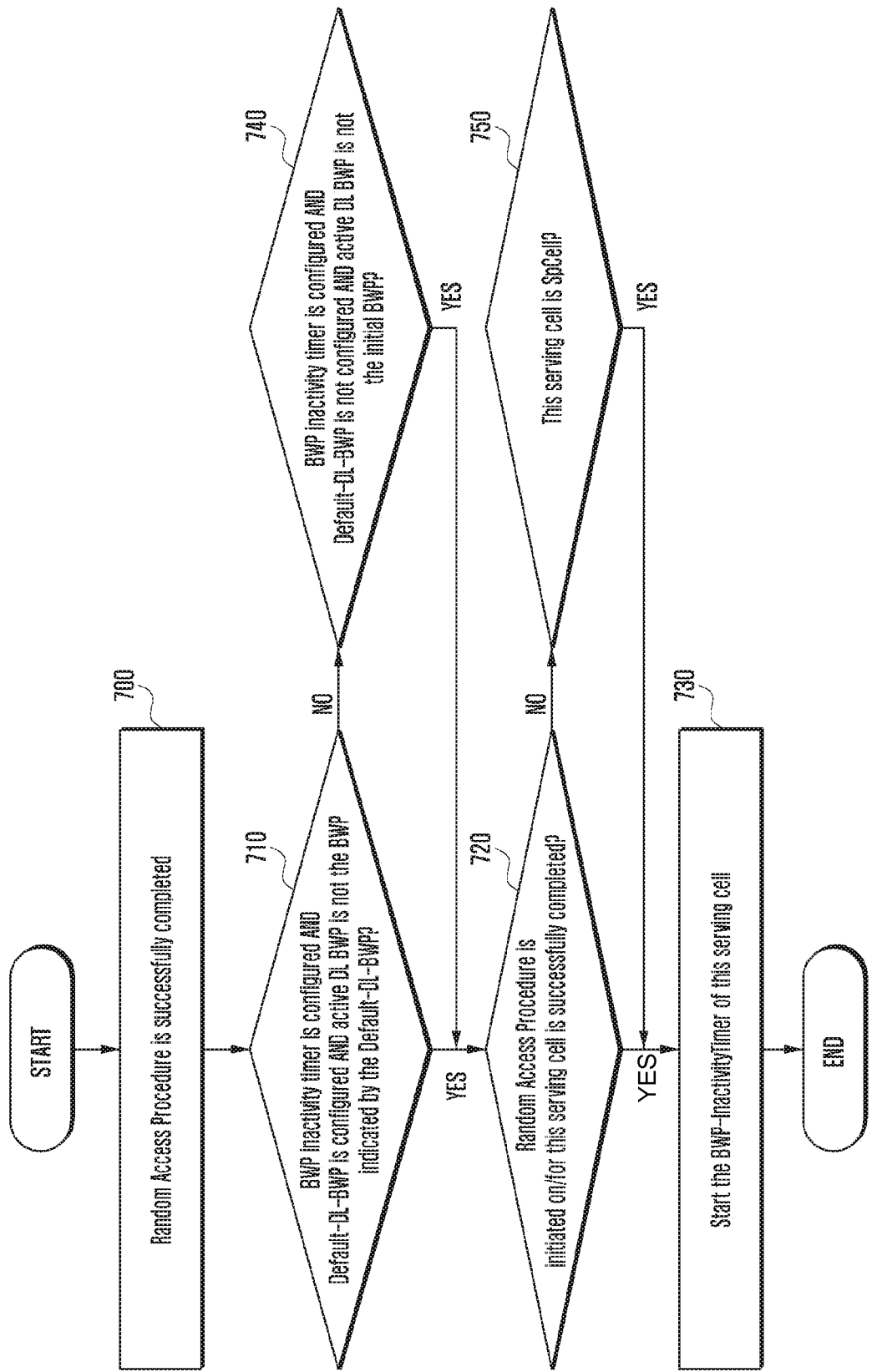
FIG. 7 illustrates UE operation in another embodiment of the proposed invention to handle BWP-InactivityTimer when UE is configured with multiple serving cells and random access procedure is completed according to an embodiment of the disclosure.
Figure 8:
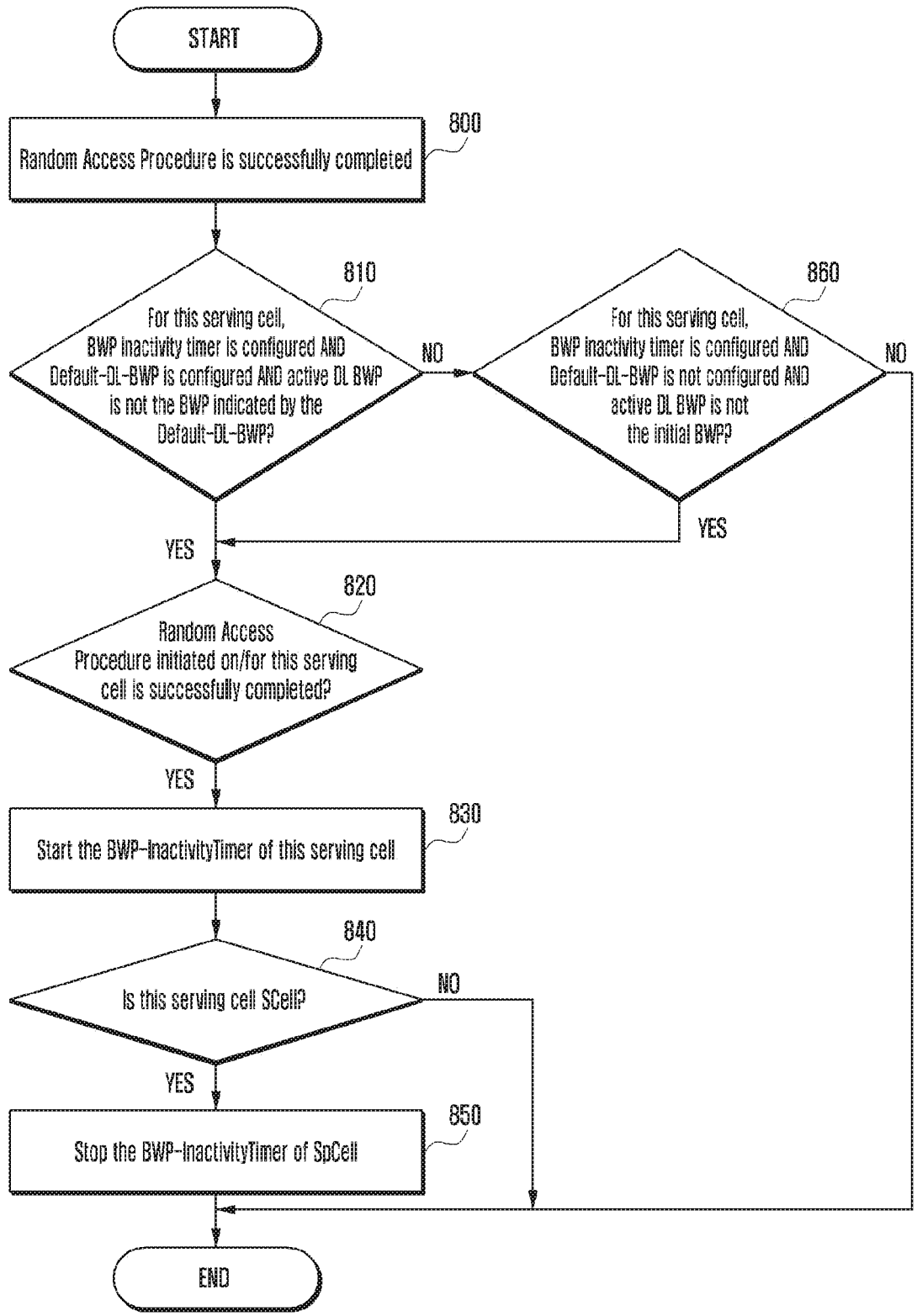
FIG. 8 illustrates UE operation in another embodiment of the proposed invention to handle BWP-InactivityTimer when UE is configured with multiple serving cells and random access procedure is completed according to an embodiment of the disclosure.

FIG. 7 illustrates UE operation in another embodiment of the proposed invention to handle BWP-InactivityTimer upon completion of random access procedure according to an embodiment of the disclosure. Referring to FIG. 7, in an embodiment, upon completion of random access procedure this operation is performed by MAC entity in UE for each activated serving cell which are configured with BWP inactivity timer. In another embodiment, upon completion of random access procedure this operation is performed by MAC entity in UE for following serving cells:
  a) for serving cell on which the completed random access procedure was initiated if BWP inactivity timer is configured on this serving cell.
  b) for SpCell if the serving cell on which the completed random access procedure was initiated is not SpCell and if BWP inactivity timer is configured for SpCell.
  1> If the Default-DL-BWP is configured, and the active DL BWP is not the BWP indicated by the Default-DL-BWP (operation 700); or
  1> if the Default-DL-BWP is not configured, and the active DL BWP is not the initial BWP (operation 730):
    2> if random access procedure initiated on this serving cell is successfully completed (operation 710):
      3> start the BWP-InactivityTimer (i.e. start the BWP-InactivityTimer associated with active DL BWP of this serving cell or start the BWP-InactivityTimer of this serving cell) (operation 720);
    2> else if random access procedure is initiated on another serving cell and if this serving cell is SpCell (operation 740)
      3> start the BWP-InactivityTimer associated (i.e. start the BWP-InactivityTimer associated with active DL BWP of this serving cell or start the BWP-InactivityTimer of this serving cell) (operation 720);

FIG. 8 illustrates UE operation in another embodiment of the proposed invention to handle BWP-InactivityTimer when random access procedure is completed according to an embodiment of the disclosure. Referring to FIG. 8, upon completion of random access procedure this operation is performed by MAC entity in UE for serving cell on which the completed random access procedure was initiated.

In operation 800, random access procedure is successfully completed.

Figure 9:
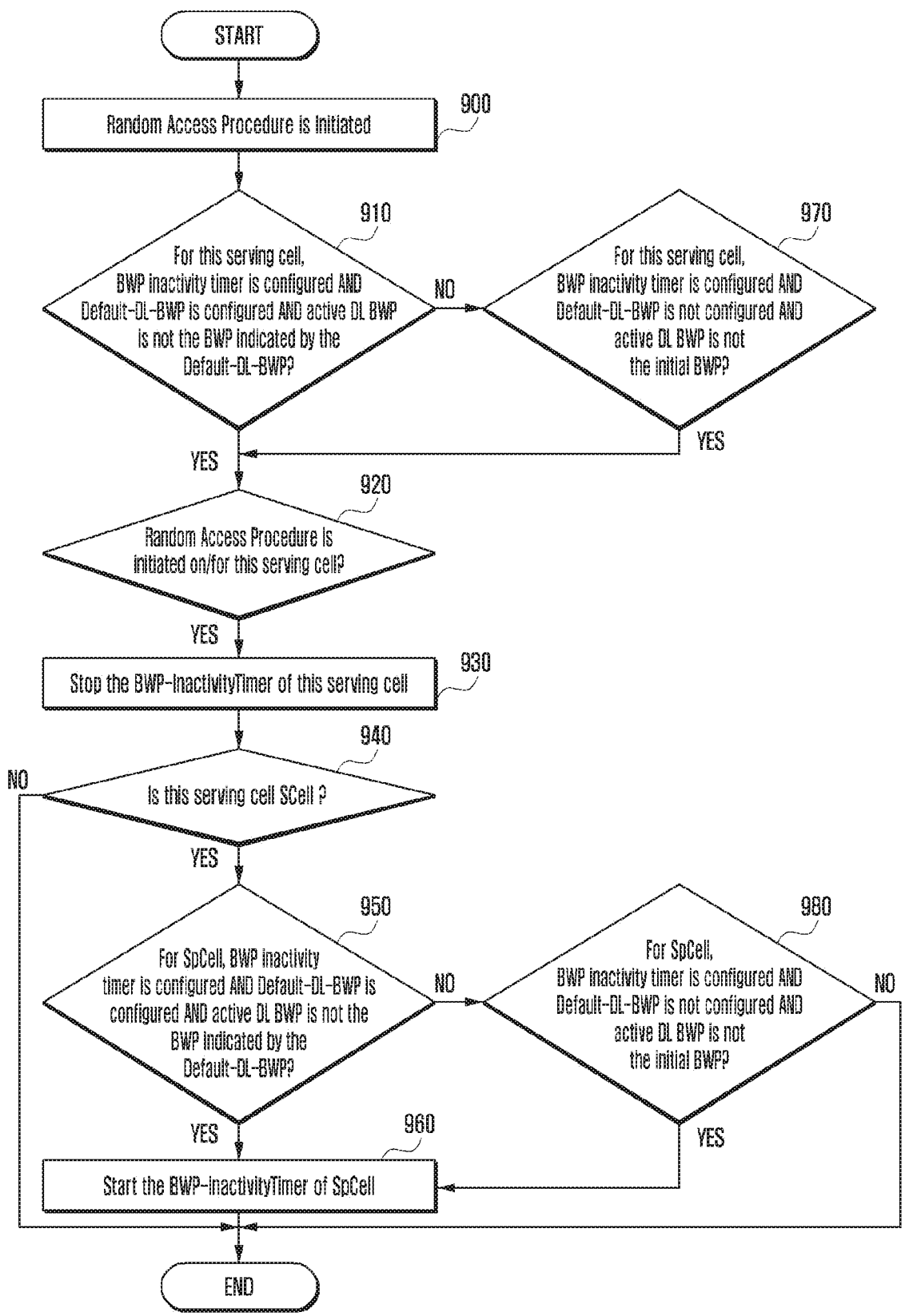
FIG. 9 illustrates UE operation in another embodiment of the proposed invention to handle BWP-InactivityTimer when UE is configured with multiple serving cells and random access procedure is completed according to an embodiment of the disclosure.

If BWP inactivity timer is configured, the BWP inactivity timer is operated by the UE as follows:
  1> If the Default-DL-BWP is configured, and the active DL BWP is not the BWP indicated by the Default-DL-BWP (operation 810); or
  1> if the Default-DL-BWP is not configured, and the active DL BWP is not the initial BWP (operation 850):
    2> start the BWP-InactivityTimer (i.e. start the BWP-InactivityTimer associated with active DL BWP of this serving cell or start the BWP-InactivityTimer of this serving cell) (operation 820);
    2> if this serving cell is SCell (i.e. secondary cell other than PSCell) (operation 830):
      3> start the BWP-InactivityTimer of SpCell, if configured (i.e. start the BWP-InactivityTimer associated with active DL BWP of SpCell or start the BWP-InactivityTimer of SpCell) (operation 840);

FIG. 9 illustrates UE operation in another embodiment of the proposed invention to handle BWP-InactivityTimer when random access procedure is completed according to an embodiment of the disclosure. Referring to FIG. 9, upon completion of random access procedure this operation is performed by MAC entity in UE for serving cell on which the completed random access procedure was initiated.

In operation 900, random access procedure is successfully completed.
  1> If the Default-DL-BWP is configured, and the active DL BWP is not the BWP indicated by the Default-DL-BWP (operation 910); or
  1> if the Default-DL-BWP is not configured, and the active DL BWP is not the initial BWP (operation 960):
    2> start the BWP-InactivityTimer (i.e. start the BWP-InactivityTimer associated with active DL BWP of this serving cell or start the BWP-InactivityTimer of this serving cell) (operation 920);
    2> if this serving cell is SCell (i.e. secondary cell other than PSCell) (operation 930):
      3> if BWP inactivity timer is configured for the SpCell:
        4> If the Default-DL-BWP is configured, and the active DL BWP is not the BWP indicated by the Default-DL-BWP (operation 940); or
        4> if the Default-DL-BWP is not configured, and the active DL BWP is not the initial BWP (operation 970);
          5> start the BWP-InactivityTimer of SpCell (i.e. start the BWP-InactivityTimer associated with active DL BWP of this SpCell or start the BWP-InactivityTimer of SpCell) (operation 950);

In one method of the invention it is proposed to handle BWP Inactivity timer when PDCCH with DL Assignment is received on or for the active DL BWP If random access procedure is initiated, UE stops the BWP-InactivityTimer. The purpose of stopping the BWP-InactivityTimer is to prevent BWP switching (i.e. switching to default BWP or initial BWP) during the random access procedure. If the Default-DL-BWP is configured, and the active DL BWP is not the BWP indicated by the Default-DL-BWP; or if the Default-DL-BWP is not configured, and the active DL BWP is not the initial BWP: if a PDCCH indicating downlink assignment is received on the active BWP, MAC entity in UE starts or restarts the BWP-InactivityTimer associated with the active DL BWP. In above-mentioned procedure, BWP switching cannot be avoided as UE may restart BWP-InactivityTimer during the random access procedure. This leads to interruption as random access procedure needs to be stopped and restarted upon BWP switching.

Figure 10:
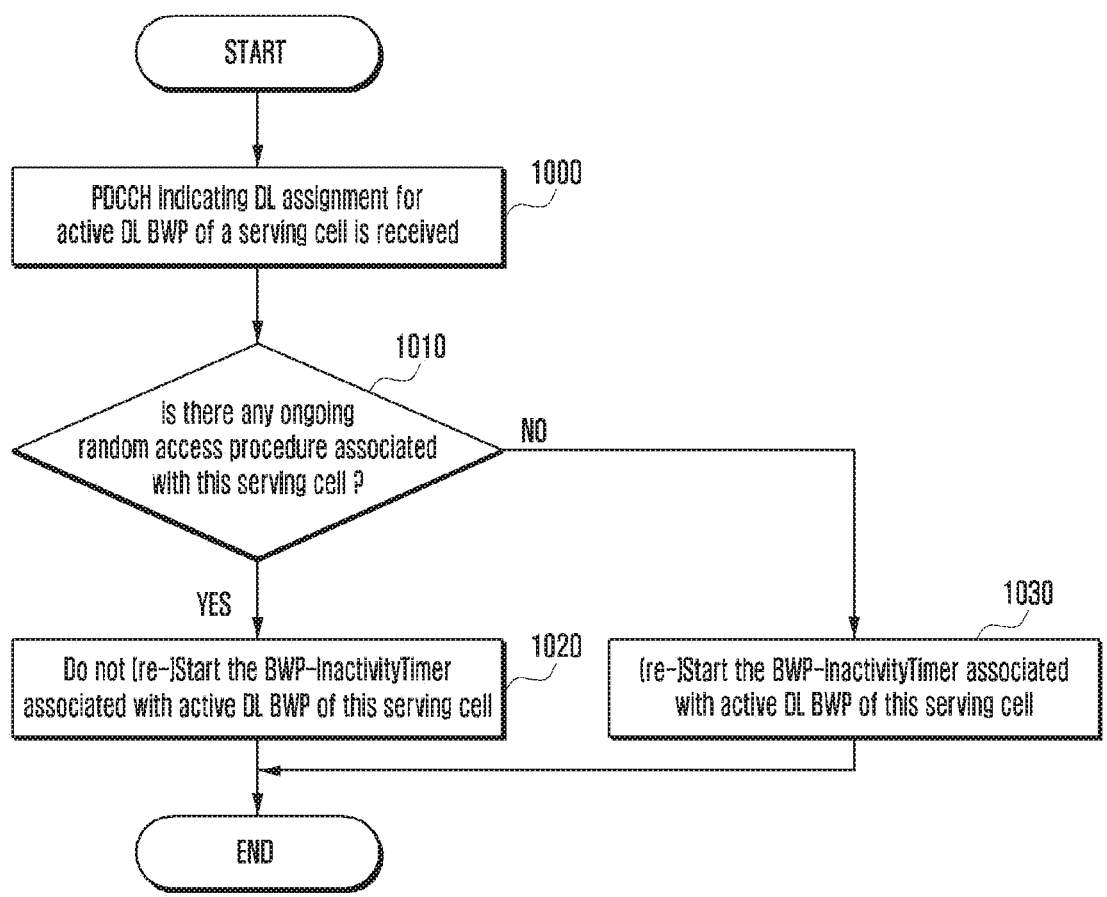
FIG. 10 illustrates UE operation in one embodiment of the proposed invention to handle BWP-InactivityTimer when PDCCH with DL Assignment is received on or for the active DL BWP according to an embodiment of the disclosure.

In an embodiment of the proposed invention we propose that the UE follow the operation as illustrated in FIG. 10 when UE receives a PDCCH indicating DL assignment for an active DL BWP of a serving cell.

FIG. 10 illustrates UE operation in one embodiment of the proposed invention to handle BWP-InactivityTimer when PDCCH with DL Assignment is received for the active DL BWP according to an embodiment of the disclosure.

Referring to FIG. 10, in operation 1000, PDCCH indicating DL assignment for an active DL BWP X may be received in active DL BWP X or it may be received in another active DL BWP Y. For example, PDCCH received in DL BWP Y may include DL assignment for DL BWP X. DL BWP X and Y may be the BWPs of same serving cell or different serving cells.

In operation 1010, if there is any ongoing random access procedure associated with the serving cell of active DL BWP for which DL assignment is received, UE does not (re-)start BWP-InactivityTimer associated with active DL BWP for which the DL assignment is received in operation 1020. A random access procedure is associated with serving cell if the PRACH preamble was transmitted on the serving cell by UE and/or UE receives RAR on the serving cell. In some cases, multiple serving cells can be associated with a random access procedure. For example, when random access procedure is initiated for SCell (i.e. secondary cell other than PSCell) wherein UE transmits PRACH preamble on SCell and receives RAR on SpCell. So, in this case, random access procedure is associated with SCell as well as SpCell. For example, if random access procedure is initiated on SpCell, UE transmits PRACH preamble on SpCell and receives RAR on SpCell. So, in this case, random access procedure is associated with SpCell.

In operation 1010, if there is no ongoing random access procedure associated with the serving cell of active DL BWP for which DL assignment is received, UE does (re-)start BWP-InactivityTimer associated with active DL BWP for which the DL assignment is received in operation 1030.

In another embodiment of the proposed invention, MAC entity in UE perform the following operation for each activated serving cell configured with BWP inactivity timer:
1> If the Default-DL-BWP is configured, and the active DL BWP is not the BWP indicated by the Default-DL-BWP; or
1> if the Default-DL-BWP is not configured, and the active DL BWP is not the initial DL BWP:
  2> if a PDCCH addressed to C-RNTI or CS-RNTI indicating downlink assignment is received on the active DL BWP of this serving cell:
    3> if there is no ongoing random access procedure associated with this Serving cell:
      4> start or restart the BWP-InactivityTimer of this serving cell (i.e. start or restart the BWP-InactivityTimer associated with active DL BWP of this serving cell or start the BWP-InactivityTimer of this serving cell);

For example, UE receives a PDCCH addressed to C-RNTI or CS-RNTI indicating DL assignment. The PDCCH is received on an active DL BWP of serving cell X. If there is no ongoing random access procedure associated with serving cell X, UE (re-)starts BWP-InactivityTimer associated with active DL BWP of serving cell X. In this embodiment, if there are multiple active DL BWPs in a serving cell, operation of start or restart the BWP-InactivityTimer of serving cell is for the BWP-InactivityTimer associated with active DL BWP on which PDCCH addressed to C-RNTI or CS-RNTI indicating downlink assignment is received.

In another embodiment of the proposed invention, MAC entity in UE perform the following operation for each activated serving cell configured with BWP inactivity timer:
1> If the Default-DL-BWP is configured, and the active DL BWP is not the BWP indicated by the Default-DL-BWP; or
1> if the Default-DL-BWP is not configured, and the active DL BWP is not the initial BWP:
  2> if a PDCCH addressed to C-RNTI or CS-RNTI indicating downlink assignment is received for the active DL BWP of this serving cell (PDCCH indicating DL assignment for an active DL BWP X may be received in same active DL BWP X or it may be received in another active DL BWP Y. For example, PDCCH received in DL BWP Y may include DL assignment for DL BWP X. DL BWP X and Y may be the BWPs of same serving cell or different serving cell):
    3> if there is no ongoing random access procedure associated with this serving cell:
      4> start or restart the BWP-InactivityTimer of this serving cell (i.e. star or restart the BWP-InactivityTimer associated with active DL BWP of this serving cell or start the BWP-InactivityTimer of this serving cell);

For example, UE receives a PDCCH addressed to C-RNTI or CS-RNTI indicating DL assignment. The DL assignment is for active DL BWP of serving cell X. If there is no ongoing random access procedure associated with serving cell X, UE (re-)starts BWP-InactivityTimer associated with active DL BWP of serving cell X. Note that PDCCH indicating this DL assignment may be received on active DL BWP of serving cell X or another serving cell Y. In this embodiment, if there are multiple active DL BWPs in a serving cell, operation of start or restart the BWP-InactivityTimer is for the BWP-InactivityTimer associated with active DL BWP for which downlink assignment is received.

In another embodiment of the proposed invention, MAC entity in UE perform the following operation for each activated serving cell configured with BWP inactivity timer:
1> If the Default-DL-BWP is configured, and the active DL BWP is not the BWP indicated by the Default-DL-BWP; or
1> if the Default-DL-BWP is not configured, and the active DL BWP is not the initial BWP:
  2> if a PDCCH addressed to C-RNTI or CS-RNTI indicating downlink assignment is received on the active DL BWP; or
  2> if a PDCCH addressed to C-RNTI or CS-RNTI indicating downlink assignment is received for the active DL BWP (PDCCH indicating DL assignment for an active DL BWP X may be received in same active DL BWP X or it may be received in another active DL BWP Y. For example, PDCCH received in DL BWP Y may include DL assignment for DL BWP X. DL BWP X and Y may be the BWPs of same serving cell or different serving cell):
    3> if there is no ongoing random access procedure associated with this serving cell:
      4> start or restart the BWP-InactivityTimer (i.e. start or restart the BWP-InactivityTimer associated with active DL BWP of this serving cell or start the BWP-InactivityTimer of this serving cell);

In another embodiment of the proposed invention, MAC entity in UE perform the following operation for each activated serving cell configured with BWP inactivity timer:
1> if a PDCCH addressed to C-RNTI or CS-RNTI indicating downlink assignment is received on or for the active DL BWP of a serving cell:
  2> if this serving cell is a SpCell:
    3> if there is no ongoing random access procedure (no ongoing random access procedure initiated on this serving cell or any SCell of the CG associated with SpCell), start or restart the BWP-InactivityTimer of this Serving Cell (i.e. start or restart the BWP-InactivityTimer associated with active DL BWP of this serving cell or start the BWP-InactivityTimer of this serving cell);
  2> else
    3> if there is no ongoing random access procedure initiated on this serving cell, start or restart the BWP-InactivityTimer of this Serving Cell (i.e. start or restart the BWP-InactivityTimer associated with active DL BWP of this serving cell or start the BWP-InactivityTimer of this serving cell)

In another embodiment of the proposed invention, MAC entity in UE perform the following operation for each activated serving cell configured with BWP inactivity timer:
1> if a PDCCH addressed to C-RNTI or CS-RNTI indicating downlink assignment is received on or for the active DL BWP of a serving cell:
  2> if this serving cell is a SCell (i.e. secondary cell other than PSCell):
    3> if there is no ongoing random access procedure initiated on this serving cell, start or restart the BWP-InactivityTimer of this Serving Cell (i.e. start or restart the BWP-InactivityTimer associated with active DL BWP of this serving cell or start the BWP-InactivityTimer of this serving cell);
  2> else
    3> if there is no ongoing random access procedure (no ongoing random access procedure initiated on this serving cell or any SCell of the CG associated with SpCell), start or restart the BWP-InactivityTimer of this Serving Cell (i.e. start or restart the BWP-InactivityTimer associated with active DL BWP of this serving cell or start the BWP-InactivityTimer of this serving cell).

In one method of the invention it is proposed to handle BWP Inactivity timer when PDCCH with UL Grant is received on or for the active BWP If random access procedure is initiated, UE stops the BWP-InactivityTimer. The purpose of stopping the BWP-InactivityTimer is to prevent BWP switching (i.e. switching to default BWP or initial BWP) during the random access procedure. If the Default-DL-BWP is configured, and the active DL BWP is not the BWP indicated by the Default-DL-BWP; or if the Default-DL-BWP is not configured, and the active DL BWP is not the initial BWP: if a PDCCH indicating UL grant is received on or for the active BWP; MAC entity starts or restarts the BWP-InactivityTimer associated with the active DL BWP. In the abovementioned procedure, BWP switching cannot be avoided as UE may restart BWP-InactivityTimer during the random access procedure. This leads to interruption as random access procedure needs to be stopped and restarted.

Figure 11:
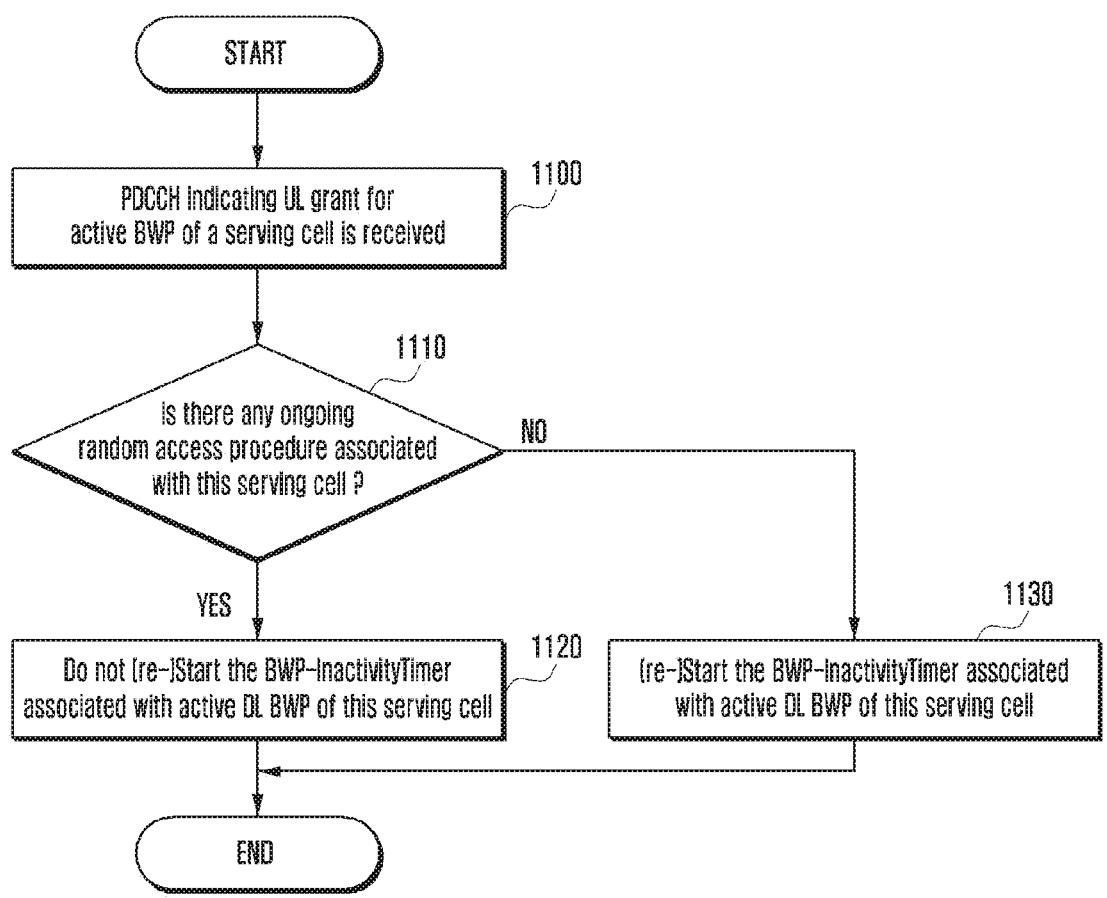
FIG. 11 illustrates UE operation in one embodiment of the proposed invention to handle BWP-InactivityTimer when PDCCH with UL Grant is received on or for the active BWP according to an embodiment of the disclosure.

In an embodiment of the proposed invention we propose that UE follow the operation as illustrated in FIG. 11 when UE receives a PDCCH indicating UL grant for active BWP (i.e. active UL BWP).

FIG. 11 illustrates UE operation in one embodiment of the proposed invention to handle BWP-InactivityTimer when PDCCH with UL Grant is received on the active BWP according to an embodiment of the disclosure.

Referring to FIG. 11, in operation 1100, a PDCCH indicating UL grant for the active BWP is received.

In operation 1110, if there is any ongoing random access procedure associated with the serving cell of active BWP for which UL grant is received, UE does not (re-)start BWP-InactivityTimer associated with active DL BWP of this serving cell in operation 1120. A random access procedure is associated with serving cell if the PRACH preamble was transmitted on the serving cell by UE and/or UE receives RAR on the serving cell. In some cases, multiple serving cells can be associated with random access procedure. For example, when random access procedure is initiated for SCell (other than PSCell) wherein UE transmits PRACH preamble on SCell and receives RAR on SpCell. So, in this case, random access procedure is associated with SCell as well as SpCell. For example, if random access procedure is initiated on SpCell, UE transmits PRACH preamble on SpCell and receives RAR on SpCell. Thus, in this case, random access procedure is associated with SpCell.

In operation 1110, if there is no ongoing random access procedure associated with the serving cell of active BWP for which UL grant is received, UE does (re-)start BWP-InactivityTimer associated with active DL BWP for which the UL grant is received in operation 1130.

In another embodiment of the proposed invention, MAC entity in UE perform the following operation for each activated serving cell configured with BWP inactivity timer:
1> If the Default-DL-BWP is configured, and the active DL BWP is not the BWP indicated by the Default-DL-BWP; or
1> if the Default-DL-BWP is not configured, and the active DL BWP is not the initial BWP:
  2> if a PDCCH addressed to C-RNTI or CS-RNTI indicating uplink grant is received on the active BWP of this serving cell:
    3> if there is no ongoing random access procedure associated with this Serving Cell:
      4> start or restart the BWP-InactivityTimer of this Serving Cell (i.e. start or restart the BWP-InactivityTimer associated with active DL BWP of this serving cell or (re-)start the BWP-InactivityTimer of this serving cell);

For example, UE receives a PDCCH addressed to C-RNTI or CS-RNTI indicating uplink grant. The PDCCH is received on an active DL BWP of serving cell X. If there is no ongoing random access procedure associated with serving cell X, UE (re-)starts BWP-InactivityTimer associated with active DL BWP of serving cell X. In this embodiment, if there are multiple active DL BWPs in a serving cell, operation of start or restart the BWP-InactivityTimer is for the BWP-InactivityTimer associated with active DL BWP on which PDCCH addressed to C-RNTI or CS-RNTI indicating UL grant is received.

In another embodiment of the proposed invention, MAC entity in UE perform the following operation for each activated serving cell configured with BWP inactivity timer:
1> If the Default-DL-BWP is configured, and the active DL BWP is not the BWP indicated by the Default-DL-BWP; or 1> if the Default-DL-BWP is not configured, and the active DL BWP is not the initial BWP:
  2> if a PDCCH addressed to C-RNTI or CS-RNTI indicating uplink grant is received for the active BWP of this serving cell:
    3> if there is no ongoing random access procedure associated with this Serving Cell:
      4> start or restart the BWP-InactivityTimer of this serving cell (i.e. start or restart the BWP-InactivityTimer associated with active DL BWP of this serving cell or start the BWP-InactivityTimer of this serving cell);

For example, UE receives a PDCCH addressed to C-RNTI or CS-RNTI indicating uplink grant. The UL grant is for active UL BWP of serving cell X. If there is no ongoing random access procedure associated with serving cell X, UE (re-)starts BWP-InactivityTimer associated with active DL BWP of serving cell X. Note that PDCCH indicating this UL grant may be received on active DL BWP of serving cell X or another serving cell Y. In this embodiment, if there are multiple active DL BWPs in a serving cell, operation of start or restart the BWP-InactivityTimer is for the BWP-InactivityTimer associated with active DL BWP linked with (i.e. have same BWP ID as the) UL BWP for which UL grant is received.

In another embodiment of the proposed invention, MAC entity in UE perform the following operation for each activated serving cell configured with BWP inactivity timer:
1> if a PDCCH addressed to C-RNTI or CS-RNTI indicating uplink grant is received on or for the active BWP of a serving cell:
  2> if this serving cell is a SpCell:
    3> if there is no ongoing random access procedure (no ongoing random access procedure initiated on this serving cell or any SCell of the CG associated with SpCell), start or restart the BWP-InactivityTimer of this Serving Cell (i.e. start or restart the BWP-InactivityTimer associated with active DL BWP of this serving cell or start the BWP-InactivityTimer of this serving cell);
  2> else
    3> if there is no ongoing random access procedure initiated on this serving cell, start or restart the BWP-InactivityTimer of this Serving Cell (i.e. start or restart the BWP-InactivityTimer associated with active DL BWP of this serving cell or start the BWP-InactivityTimer of this serving cell)

In another embodiment of the proposed invention, MAC entity in UE perform the following operation for each activated serving cell configured with BWP inactivity timer:
1> if a PDCCH addressed to C-RNTI or CS-RNTI indicating uplink grant is received on or for the active BWP of a serving cell:
  2> if this serving cell is a SCell (i.e. secondary cell other than PSCell):
    3> if there is no ongoing random access procedure initiated on this serving cell, start or restart the BWP-InactivityTimer of this Serving Cell (i.e. start or restart the BWP-InactivityTimer associated with active DL BWP of this serving cell or start the BWP-InactivityTimer of this serving cell);
  2> else
    3> if there is no ongoing random access procedure (no ongoing random access procedure initiated on this serving cell or any SCell of the CG associated with SpCell), start or restart the BWP-InactivityTimer of this Serving Cell (i.e. start or restart the BWP-InactivityTimer associated with active DL BWP of this serving cell or start the BWP-InactivityTimer of this serving cell)

In one method of the invention it is proposed to handle Measurement Gap during Beam Failure Recovery Response Window The beam failure recovery request procedure is used for indicating to the serving gNB of a new SSB or CSI-RS when beam failure is detected on the serving SSB(s)/CSI-RS(s). For beam failure recovery request, UE transmits the contention free Random Access Preamble. It is to be noted that Random access preambles and/or PRACH resources can be dedicated for beam failure recovery request. After transmitting the contention free Random Access Preamble for beam failure recovery request, UE start the bfr-ResponseWindow (i.e. RAR window configured in beam failure recovery configuration signaled by gNB to UE) at the start of the first PDCCH occasion after a fixed duration of X symbols from the end of the preamble transmission. bfr-ResponseWindow (in units of number of slots or subframes or TTIs or PDCCH occasions or OFDM symbols) is configured in system information or in a dedicated RRC signaling. UE monitors the PDCCH of the SpCell for response to beam failure recovery request identified by the C-RNTI while bfr-ResponseWindow is running.

It is possible that one or more time slots in bfr-ResponseWindow may overlap with the measurement gaps. During a measurement gap, UE normally does not monitor PDCCH, does not perform the transmission of HARQ feedback and CQI/PMI/RI/CRI, does not report SRS and does not transmit UL-SCH (except for Msg3). We propose if a measurement gap occur during the bfr-ResponseWindow, UE prioritizes monitoring the PDCCH of the SpCell for response to beam failure recovery request identified by the C-RNTI instead of skipping the PDCCH monitoring. Beam failure recovery procedure is important than performing measurements during the measurement gaps.

Figure 12:
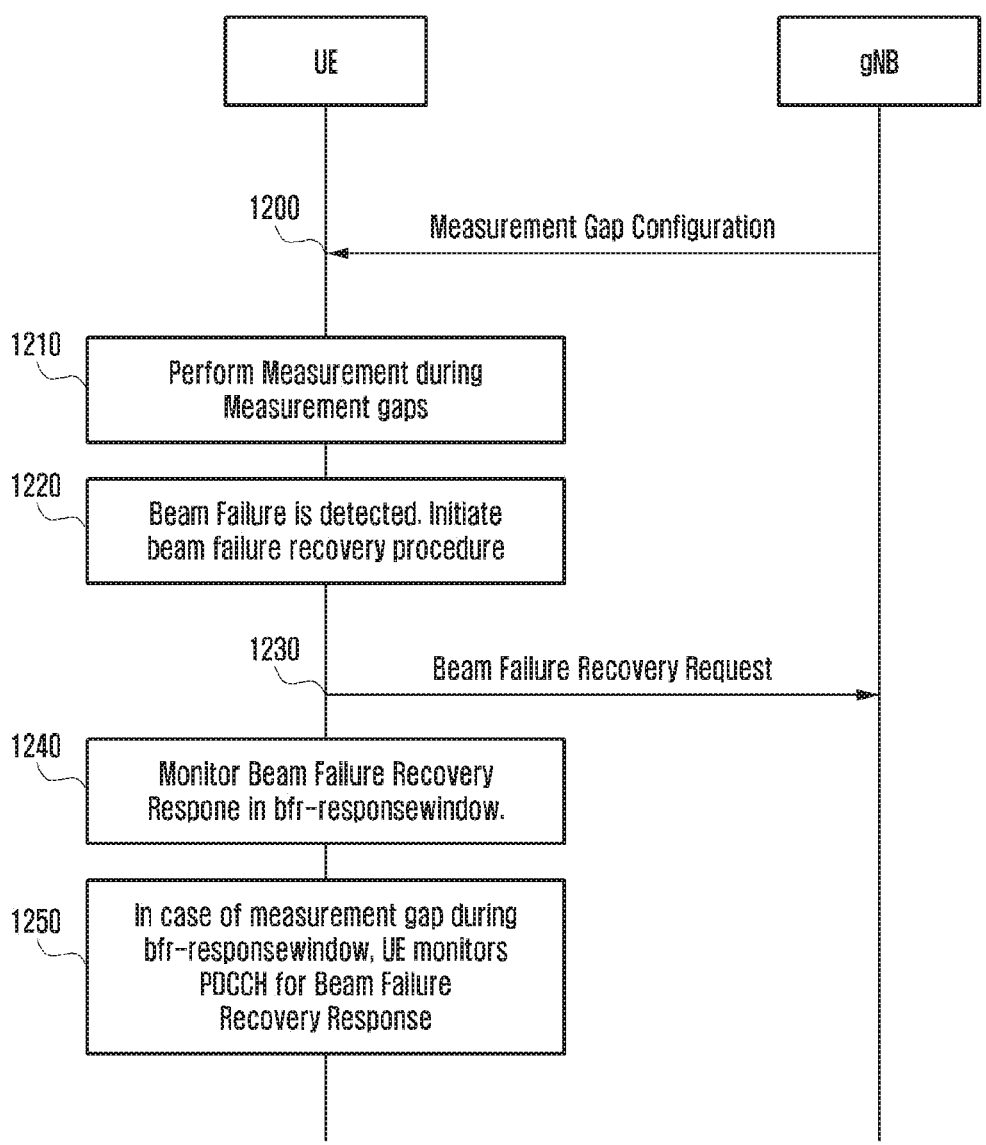
FIG. 12 illustrates UE operation in one embodiment of the proposed invention to handle measurement gap during Beam Failure Recovery Response Window according to an embodiment of the disclosure.

FIG. 12 illustrates UE operation in one embodiment of the proposed invention to handle measurement gap during Beam Failure Recovery Response Window according to an embodiment of the disclosure.

Referring to FIG. 12, in operation 1200, UE receives measurement gap configuration from gNB.

In operation 1210, UE performs measurement during measurement gaps.

In operation 1220, if beam failure is detected, UE initiates beam failure recovery procedure.

In operation 1230, UE transmits beam failure recovery request to gNB.

In operation 1240, UE monitors beam failure recovery response in bfr-ResponseWindow.

In an embodiment, during a measurement gap, the UE (or MAC entity in UE) shall:
1> if the bfr-ResponseWindow is running.
  2> monitor the PDCCH addressed to C-RNTI; UE monitors the PDCCH of the SpCell for response to beam failure recovery request identified by the C-RNTI In an embodiment, during a measurement gap, the MAC entity shall:
1> if the ra-ResponseWindow, bfr-ResponseWindow or the ra-ContentionResolutionTimer is running:
  2> monitor the PDCCH; (Note: In case of ra-ResponseWindow, UE monitors for PDCCH addressed to RA-RNTI. In case of bfr-ResponseWindow, UE monitors for PDCCH addressed to C-RNTI. In case of ra-ContentionResolutionTimer, UE monitors for PDCCH addressed to C-RNTI.)
1> else:
2> not monitor the PDCCH.

In operation 1250, in case of measurement gap during bfr-ResponseWindow, UE monitors PDCCH for beam failure recovery response.

In one method of the invention it is proposed to enhance Beam Failure Recovery Procedure The current procedure for beam failure recovery is defined as follows: The beam failure recovery request procedure is used for indicating to the serving gNB of a new SSB or CSI-RS when beam failure is detected on the serving SSB(s)/CSI-RS(s). Beam failure is detected by the lower layers and indicated to the MAC entity.

The MAC entity shall:
1> if beam failure indication has been received from lower layers:
2> start or restart the beamFailureRecoveryTimer;
2> increment BFI_COUNTER by 1;
2> if BFI_COUNTER>=beamFailureInstanceMaxCount:
3> if beamFailureRecoveryConfig is configured for the active UL BWP:
4> start the beamFailureRecoveryTimer, if configured;
4> initiate a random access procedure (see 3GPP TS 38.321 subclause 5.1) on the SpCell by applying the parameters powerRampingStep, preambleReceivedTargetPower, and preambleTransMax configured in beamFailureRecoveryConfig.
3> else:
4> initiate a random access procedure (see 3GPP TS 38.321 subclause 5.1) on the SpCell.
1> if the beamFailureRecoveryTimer expires; or
1> if beamFailureDetectionTimer, beamFailureInstanceMaxCount, or any of the reference signals used for beam failure detection is reconfigured by upper layers:
2> set BFI_COUNTER to 0
1> if downlink assignment or uplink grant on the PDCCH addressed for the C-RNTI has been received:
2> stop and reset beamFailureRecoveryTimer;
2> consider the Beam Failure Recovery Request procedure successfully completed.

In case contention based random access procedure is used for beam failure recovery and recovery is successful, beamFailureRecoveryTimer will continue to run and on expiry it will reset the BFI_COUNTER. As a result, the subsequent beam failure detection and recovery is affected.

In order to overcome the above issues, the following enhanced procedure is proposed in an embodiment of the proposed invention. The main point is that upon successful completion of random access procedure initiated for beam failure recovery, beamFailureRecoveryTimer is stopped if the beamFailureRecoveryTimer is configured by gNB in RRC signaling 1> if beam failure indication has been received from lower layers (i.e. Physical layer):
2> start or restart the beamFailureRecoveryTimer;
2> increment BFI_COUNTER by 1;
2> if BFI_COUNTER>=beamFailureInstanceMaxCount:
3> if beamFailureRecoveryConfig is configured for the active UL BWP:
4> start the beamFailureRecoveryTimer, if configured;
4> initiate a random access procedure (see subclause 5.1) on the SpCell by applying the parameters powerRampingStep, preambleReceivedTargetPower, and preambleTransMax configured in beamFailureRecoveryConfig.
3> else:
4> initiate a random access procedure (e.g. on SpCell);
1> if the beamFailureRecoveryTimer expires; or
1> if beamFailureDetectionTimer, beamFailureInstanceMaxCount, or any of the reference signals used for beam failure detection is reconfigured by upper layers:
2> set BFI_COUNTER to 0;
1> if the random access procedure initiated for beam failure recovery is successfully completed:
3> stop the beamFailureRecoveryTimer, if configured;
3> set BFI_COUNTER to 0;
3> consider the Beam Failure Recovery Request procedure successfully completed;

In an embodiment, if contention free random access preamble and/or PRACH occasion is used for transmitting PRACH preamble and if PDCCH in recovery search space addressed to C-RNTI is received while RandomAccessResponseWindow is running, random access procedure initiated for beam failure recovery is considered successfully completed. Otherwise if random access preamble was selected amongst the contention based random access preambles for transmitting PRACH preamble and if PDCCH addressed to C-RNTI is received while ra-ContentionResolutionTimer is running, random access procedure initiated for beam failure recovery is considered successfully completed. As explained earlier, if random access procedure is initiated by UE is not for beam failure recovery, if random access preamble was selected amongst the contention based random access preambles for transmitting PRACH preamble and if PDCCH addressed to C-RNTI indicating UL assignment for new transmission is received while ra-ContentionResolutionTimer is running, random access procedure is considered successfully completed.

In another embodiment, if contention free random access preamble and/or PRACH occasion is used for transmitting PRACH preamble and if PDCCH in recovery search space addressed to C-RNTI is received while RandomAccessResponseWindow is running, random access procedure initiated for beam failure recovery is considered successfully completed. Otherwise if random access preamble was selected amongst the contention based random access preambles for transmitting PRACH preamble and if PDCCH addressed to C-RNTI indicating a DL or UL assignment is received while ra-ContentionResolutionTimer is running, random access procedure initiated for beam failure recovery is considered successfully completed. As explained earlier, if random access procedure is initiated by UE is not for beam failure recovery, if random access preamble was selected amongst the contention based random access preambles for transmitting PRACH preamble and if PDCCH addressed to C-RNTI indicating UL assignment for new transmission is received while ra-ContentionResolutionTimer is running, random access procedure is considered successfully completed.

In one method of the invention it is proposed to handle Temporary C-RNTI for Contention Based Random Access (CBRA) Procedure.

CBRA Procedure includes the following 4 steps:
1. UE transmits random access preamble to gNB. The random access preamble is selected from the contention based random access preambles.
2. GNB transmits the RAR on PDSCH addressed to RA-RNTI. RA-RNTI identifies the time-frequency slot in which RA preamble was detected by gNB. RAR conveys RA preamble identifier, Timing alignment information, Temporary C-RNTI and UL grant for message 3. RAR may also include back off indicator to instruct UE to back off for period of time before retrying RA attempt. RAR is transmitted in RAR window. RAR window size is configurable.
3. UE transmits CCCH SDU in UL grant received in RAR. It is used to transmit message such as RRC Connection Request, RRC Connection Re-establishment request, RRC handover confirm, scheduling request, SI request etc. This is commonly referred as MSG3. After sending Msg3, UE waits for Msg 4. UE also starts contention resolution timer.
4. If UE receives PDCCH addressed to TEMPORARY_C-RNTI and if the MAC PDU is successfully decoded:
 1> if the MAC PDU contains a UE Contention Resolution Identity MAC CE; and
 1> if the UE Contention Resolution Identity in the MAC CE matches the CCCH SDU transmitted in Msg3:
  2> consider this Contention Resolution successful;
  2> set the C-RNTI to the value of the TEMPORARY_C-RNTI;

In the current procedure, after the contention resolution is successful, UE always promote TEMPORARY_C-RNTI to C-RNTI. In the invention we propose that depending on type of message included in CCCH SDU, UE decide whether to promote TEMPORARY_C-RNTI to C-RNTI or not. If the contention resolution is successful and If CCCH SDU does not includes SI request or if SI request was not transmitted in Msg3 or if the random access procedure was not triggered for SI request, UE promotes TEMPORARY_C-RNTI to C-RNTI. Otherwise UE does not promote TEMPORARY_C-RNTI to C-RNTI. It only indicates reception of SI request ack to upper layers.
 1> After transmitting the CCCH SDU in Msg3, if UE receives PDCCH addressed to TEMPORARY_C-RNTI and if the MAC PDU is successfully decoded:
  2> if the MAC PDU contains a UE Contention Resolution Identity MAC CE; and
  2> if the UE Contention Resolution Identity in the MAC CE matches the CCCH SDU transmitted in Msg3:
   3> consider this Contention Resolution successful;
   3> if SI request was not transmitted in Msg3:
    4> set the C-RNTI to the value of the TEMPORARY_C-RNTI;
   3> else if SI request was transmitted in Msg3:
    4> Inform upper layer that SI ack is received In one method of the invention it is proposed to handle PDCCH Indicating BWP switching.
 <Method 1>
In the existing design, UE always switch BWP upon receiving BWP switching command. This may interrupt the ongoing random access procedure and hence delays the completion of random access procedure. The UE operation in one embodiment of the proposed invention is as follows:
 UE receives from gNB a PDCCH or RRC reconfiguration message for BWP switching for a serving cell. UE checks whether there is any ongoing random access procedure associated with this serving cell.
 If there is no ongoing random access procedure associated with this serving cell
  Perform BWP switching to a BWP indicated by the PDCCH or RRC reconfiguration message.
 Else If there is ongoing random access procedure associated with this serving cell:
  Option 1: Perform BWP switching to a BWP indicated by the PDCCH or RRC reconfiguration message.
  Option 2: Ignore the PDCCH for BWP switching.
  If the MAC entity decides to perform BWP switching, the MAC entity shall stop the ongoing Random Access procedure and initiate a Random Access procedure on the new activated BWP. If the MAC decides to ignore the PDCCH for BWP switching, the MAC entity shall continue with the ongoing Random Access procedure on the active BWP.

A random access procedure is associated with serving cell if the PRACH preamble was transmitted on the serving cell by UE and/or UE receives RAR on the serving cell. For example, if random access procedure is initiated on SCell (other than PSCell), UE transmits PRACH preamble on Scell and receives RAR on SpCell. So, in this case, random access procedure is associated with SCell as well as SpCell. For example, if random access procedure is initiated on SpCell, UE transmits PRACH preamble on SpCell and receives RAR on SpCell. So, in this case, random access procedure is associated with SpCell.

The UE operation in another embodiment of the proposed invention is as follows:
 UE receives a PDCCH or RRC reconfiguration message for BWP switching for a serving cell.
 If this serving cell is SpCell:
  if there is no ongoing random access procedure (no ongoing random access procedure initiated on this serving cell or any SCell of the CG associated with SpCell),
   perform BWP switching to a BWP indicated by the PDCCH or RRC reconfiguration message;
  else
   Option 1: Perform BWP switching to a BWP indicated by the PDCCH or RRC reconfiguration message.
   Option 2: Ignore the PDCCH for BWP switching.
   If the MAC entity decides to perform BWP switching, the MAC entity shall stop the ongoing random access procedure and initiate a random access procedure on the new activated BWP. If the MAC decides to ignore the PDCCH for BWP switching, the MAC entity shall continue with the ongoing random access procedure on the serving cell.
 else if this serving cell is not SpCell:
  if there is no ongoing random access procedure initiated on this serving cell,
   perform BWP Switching to a BWP indicated by the PDCCH or RRC reconfiguration message
  else
   Option 1: Perform BWP switching to a BWP indicated by the PDCCH or RRC reconfiguration message.
   Option 2: Ignore the PDCCH or RRC reconfiguration message for BWP switching.
   If the MAC entity decides to perform BWP switching, the MAC entity shall stop the ongoing random access procedure and initiate a random access procedure on the new activated BWP. If the MAC decides to ignore the PDCCH or RRC reconfiguration message for BWP switching, the MAC entity shall continue with the ongoing random access procedure on the serving cell.

<Method 2>
UE receives from gNB a PDCCH or RRC reconfiguration message for BWP switching for a serving cell.
　If this serving cell is a SCell and the duplexing scheme on this serving cell is TDD and the received PDCCH or RRC reconfiguration message for BWP switching is for switching the active DL BWP, MAC entity performs BWP Switching to a BWP indicated by the PDCCH or RRC reconfiguration message.
　If this serving cell is a SCell and the duplexing scheme on this serving cell is TDD and the received PDCCH or RRC reconfiguration message for BWP switching is for switching the active UL BWP:
　　if there is ongoing random access procedure associated with this serving cell:
　　　Option 1: Perform BWP switching to a BWP indicated by the PDCCH or RRC reconfiguration message.
　　　Option 2: Ignore the PDCCH for BWP switching.
　　　If the MAC entity decides to perform BWP switching, the MAC entity shall stop the ongoing random access procedure and initiate a random access procedure on the new activated BWP. If the MAC decides to ignore the PDCCH for BWP switching, the MAC entity shall continue with the ongoing random access procedure on the serving cell.
　　Else
　　　Perform BWP switching to a BWP indicated by the PDCCH or RRC reconfiguration message.
　If this serving cell is a SpCell and the duplexing scheme on this serving cell is TDD and the received PDCCH or RRC reconfiguration message for BWP switching is for switching the active DL BWP:
　　if there is ongoing random access procedure associated with this serving cell:
　　　Option 1: Perform BWP switching to a BWP indicated by the PDCCH or RRC reconfiguration message.
　　　Option 2: Ignore the PDCCH for BWP switching.
　　　If the MAC entity decides to perform BWP switching, the MAC entity shall stop the ongoing random access procedure and initiate a random access procedure on the new activated BWP. If the MAC decides to ignore the PDCCH for BWP switching, the MAC entity shall continue with the ongoing random access procedure on the serving cell.
　If this serving cell is a SpCell and the duplexing scheme on this serving cell is TDD and the received PDCCH or RRC reconfiguration message for BWP switching is for switching the active UL BWP:
　　if there is ongoing random access procedure initiated (i.e. RA preamble is transmitted) on this serving cell:
　　　Option 1: Perform BWP switching to a BWP indicated by the PDCCH or RRC reconfiguration message.
　　　Option 2: Ignore the PDCCH for BWP switching.
　　　If the MAC entity decides to perform BWP switching, the MAC entity shall stop the ongoing random access procedure and initiate a random access procedure on the new activated BWP. If the MAC decides to ignore the PDCCH for BWP switching, the MAC entity shall continue with the ongoing random access procedure on the serving cell.
　　Else
　　　Perform BWP switching to a BWP indicated by the PDCCH or RRC reconfiguration message.

The advantage of method 2 is that for TDD cells, the BWP switching command can be processed in certain cases even if random access procedure is ongoing without stopping the ongoing random access procedure.

Figure 13:
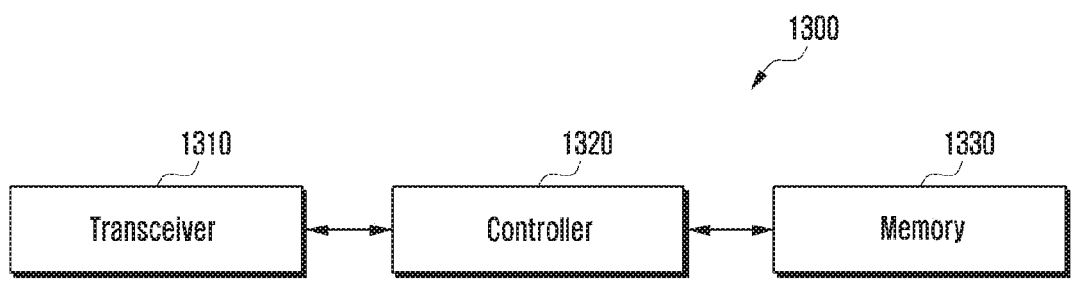
FIG. 13 illustrates a UE apparatus according to an embodiment to the disclosure.

FIG. 13 illustrates a UE apparatus according to an embodiment to the disclosure.

Referring to FIG. 13, the UE (1300) includes a transceiver (1310), a controller (1320) and a memory (1330). Alternatively, the transceiver may be implemented as a transmitter and a receiver, and each component may be implemented through one or more processors.

The transceiver (1310) is configured to receive and transmit signal, data and control information associated with BWP configuration, handling BWP-InactivityTimer, random access procedure or beam failure management.

The transceiver (1310) is configured to transmit random access preamble and receive random access response and scheduled transmission.

The controller (1320) is configured to control operation associated with BWP configuration, handling BWP-InactivityTimer, random access procedure or beam failure management above-described embodiments of the disclosure.

The controller (1320) is configured to the transceiver to receive, from a base station, first information of a first timer of a bandwidth part inactivity associated with a bandwidth part of a primary cell (PCell) and second information of a second timer of a bandwidth part inactivity associated with a bandwidth part of a secondary cell (SCell); identify that a random access procedure is initiated on the PCell or the SCell; stop the first timer, if running, in response to identifying that the random access procedure is initiated on the PCell; and stop the first timer and the second timer, if running, in response to identifying that the random access procedure is initiated on the SCell.

The SCell and the PCell are associated with the random access procedure.

The random access procedure is performed based on an active uplink (UL) bandwidth part (BWP) of the PCell or the SCell.

The random access procedure is performed based on an active downlink (DL) bandwidth part (BWP) of the PCell.

The controller (1320) is configured to control the transceiver to receive, from a base station, first information of a timer associated with bandwidth part (BWP) inactivity; control the transceiver to receive, from the base station, physical downlink control channel (PDCCH) on an active BWP associated with a serving cell; identify whether there is ongoing random access procedure associated with the serving cell; and start or re-start the timer in response to identifying that there is no ongoing random access procedure associated with the serving cell.

The active BWP is different from either a default downlink (DL) bandwidth part (BWP) or an initial BWP.

The PDCCH indicates a downlink assignment or an uplink grant.

The PDCCH is received on the active BWP or received for the active BWP.

The controller (1320) is configured to control the transceiver to transmit, to a base station, a random access preamble for initiating a random access procedure and receive, from the base station, a random access response and transmit, to the base station, a first message for requesting system information (SI) and receive, from the base station, physical downlink control channel (PDCCH) associated with a temporary cell radio network temporary identifier (TEMPORARY C-RNTI); identify whether a contention resolution is successful; identify whether a random access procedure is initiated for requesting the SI; and indicate a reception of an acknowledgement for requesting the SI to upper layer in response to identifying that the contention resolution is successful and the random access procedure is initiated for requesting the SI.

The processor is further configured to set a cell radio network temporary identifier (C-RNTI) to a value of the TEMPORARY C-RNTI in response to identifying that the contention resolution is successful and the random access procedure is not initiated for requesting the SI.

The random access procedure is associated with contention-based random access.

A contention resolution is identified successful in response to identifying that UE Contention Resolution Identity in a MAC CE received in a MAC PDU matches a CCCH SDU transmitted in the first message.

The controller (1320) is configured to control the transceiver to receive, from a base station, physical downlink control channel (PDCCH) for bandwidth part (BWP) switching of a serving cell; identify whether there is ongoing random access procedure associated with the serving cell; and perform BWP switching based on the PDCCH in response to identifying that there is no ongoing random access procedure.

The BWP switching is performed based on the PDCCH in response to identifying that there is ongoing random access procedure.

The ongoing random access procedure is stopped in response to identifying that the BWP switching is performed.

The PDCCH for BWP switching is ignored in response to identifying that there is ongoing random access procedure.

The controller (1320) is configured to control the transceiver to receive first information of a timer associated with a beam failure recovery and second information of maximum count value associated with beam failure instance; identify a number of beam failure instances; identify whether the number of beam failure instances is greater or equal to the second information; start the timer associated with the beam failure recovery in response to identifying that the number of beam failure instances is greater or equal to the second information; control the transceiver to transmit a contention-free random access preamble for initiating a random access procedure for a beam failure recovery request; control the transceiver to receive physical downlink control channel (PDCCH) associated with a cell radio network temporary identifier (C-RNTI) of the UE; identify whether the random access procedure is completed successfully; and stop the timer in response to identifying that the random access procedure is completed successfully.

The first information and the second information is received by higher layer signaling.

The number of beam failure instances is set to zero in response to identifying that the random access procedure is completed successfully.

The beam failure recovery is identified completed in response to identifying that the random access procedure is completed successfully.

The memory (1330) is configured to store information associated with BWP configuration, handling BWP-InactivityTimer, random access procedure or beam failure management above-described embodiments of the disclosure.

Figure 14:
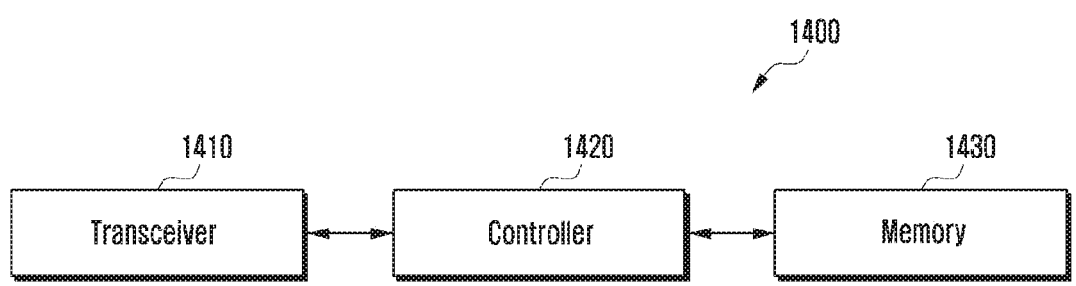
FIG. 14 illustrates a base station apparatus according to an embodiment of the disclosure.

FIG. 14 illustrates a base station apparatus according to an embodiment of the disclosure.

Referring to FIG. 14, the base station (1400) includes a transceiver (1410), a controller (1420) and a memory (1430). Alternatively, the transceiver may be implemented as a transmitter and a receiver, and each component may be implemented through one or more processors.

Referring to FIG. 14, the transceiver (1410) is configured to receive and transmit signal, data and control information associated with BWP configuration, handling BWP-InactivityTimer, random access procedure or beam failure management.

The transceiver (1410) is configured to receive random access preamble and transmit random access response and scheduled transmission.

The controller (1420) is configured to control operation associated with BWP configuration, handling BWP-InactivityTimer, random access procedure or beam failure management above-described embodiments of the disclosure.

The controller (1420) is configured to control the transceiver to: transmit, to a user equipment (UE), first information of a first timer of a bandwidth part inactivity associated with a bandwidth part of a primary cell (PCell) and second information of a second timer of a bandwidth part inactivity associated with a bandwidth part of a secondary cell (SCell); receive, from the UE, a first message associated with a random access procedure on the PCell or the SCell; and transmit, to the UE, a second message associated with the random access procedure on the PCell, wherein the first timer, if running, is stopped in response to identifying that the random access procedure is initiated on the PCell, and wherein the first timer and the second timer, if running, are stopped in response to identifying that the random access procedure is initiated on the SCell.

The first message including physical random access channel (PRACH) preamble is received on an active uplink (UL) bandwidth part (BWP) of the PCell or the SCell.

The SCell and the PCell are associated with the random access procedure.

The second message including random access response (RAR) is transmitted on an active downlink (DL) bandwidth part (BWP) of the PCell.

The controller (1420) is configured to control the transceiver to: transmit, to a user equipment (UE), first information of a timer associated with bandwidth part (BWP) inactivity; and transmit, to the UE, physical downlink control channel (PDCCH) on an active BWP associated with a serving cell, wherein the timer is started or re-started in response to identifying that there is no ongoing random access procedure associated with the serving cell.

The active BWP is different from either a default downlink (DL) bandwidth part (BWP) or an initial BWP.

The PDCCH indicates a downlink assignment or an uplink grant.

The PDCCH is transmitted on the active BWP or transmitted for the active BWP.

The controller (1420) is configured to control the transceiver to receive, from a user equipment (UE), a random access preamble for initiating a random access procedure and transmit, to the UE, a random access response and receive, from the UE, a first message for requesting system information (SI) and transmit, to the UE, physical downlink control channel (PDCCH) associated with a temporary cell radio network temporary identifier (TEMPORARY C-RNTI) and transmit, to the UE, an acknowledgement for requesting the SI in response to identifying that a contention resolution is successful and a random access procedure is initiated for requesting the SI.

A cell radio network temporary identifier (C-RNTI) is set to a value of the TEMPORARY C-RNTI in response to identifying that the contention resolution is successful and the random access procedure is not initiated for requesting the SI.

The random access procedure is associated with contention-based random access.

A contention resolution is identified successful in response to identifying that UE Contention Resolution Identity in a MAC CE transmitted in a MAC PDU matches a CCCH SDU received in the first message.

The controller (1420) is configured to control the transceiver to: transmit, to a user equipment (UE), bandwidth part (BWP) configuration information including information associated with an active bandwidth part (BWP) of a serving cell; and transmit, to the UE, physical downlink control channel (PDCCH) for bandwidth part (BWP) switching of the serving cell, wherein the BWP switching is performed based on the PDCCH in response to identifying that there is no ongoing random access procedure associated with the serving cell.

The BWP switching is performed based on the PDCCH in response to identifying that there is ongoing random access procedure associated with the serving cell.

The ongoing random access procedure is stopped in response to identifying that the BWP switching is performed.

The PDCCH for BWP switching is ignored in response to identifying that there is ongoing random access procedure associated with the serving cell.

The controller (1420) is configured to control the transceiver to: transmit, to a user equipment (UE), first information of a timer associated with a beam failure recovery and second information of maximum count value associated with beam failure instance; receive, from UE, a contention-free random access preamble for initiating a random access procedure for a beam failure recovery request; and transmit, to the UE, physical downlink control channel (PDCCH) associated with a cell radio network temporary identifier (C-RNTI) of the UE, wherein the timer is started in response to identifying that a number of beam failure instances is greater or equal to the second information and the timer is stopped in response to identifying that the random access procedure is completed successfully.

The first information and the second information is transmitted by higher layer signaling.

The number of beam failure instances is set to zero in response to identifying that the random access procedure is completed successfully.

The beam failure recovery is identified completed in response to identifying that the random access procedure is completed successfully.

The memory (1430) is configured to store information associated with BWP configuration, handling BWP-InactivityTimer, random access procedure or beam failure management above-described embodiments of the disclosure.

The above-described embodiments of the disclosure and the accompanying drawings have been provided only as specific examples in order to assist in understanding the disclosure and do not limit the scope of the disclosure. Accordingly, those skilled in the art to which the disclosure pertains will understand that other change examples based on the technical idea of the disclosure may be made without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

The operations performed by the module, programming module, or any other component according to various embodiments may be executed sequentially, in parallel, repeatedly, or by a heuristic method. Additionally, some operations may be executed in different orders or omitted, or any other operation may be added.

The methods of the embodiments illustrated in FIGS. 1 to 12 can include a combination of methods from more than one illustration. For example, FIGS. 1 to 12 illustrate operations related to a random access procedure and based on various embodiments, the methods can include a combination of methods from more than one illustration.

What is claimed is:

1. A method performed by a terminal in a wireless communication system, the method comprising:
    receiving, from a base station, a physical downlink control channel (PDCCH) for a bandwidth part (BWP) switching of a serving cell, the PDCCH including a downlink assignment or an uplink grant;
    in response to receiving the PDCCH for the BWP switching of the serving cell, identifying whether there is ongoing random access procedure associated with the serving cell;
    in response to identifying that there is no ongoing random access procedure based on receiving the PDCCH for the BWP switching of the serving cell, performing the BWP switching to a BWP indicated by the PDCCH; and
    in response to identifying that there is an ongoing random access procedure based on the receiving the PDCCH for the BWP switching of the serving cell, performing a first procedure or a second procedure,
    wherein the first procedure includes:
        stopping the ongoing random access procedure,
        performing the BWP switching to the BWP indicated by the PDCCH, and
        initiating another random access procedure after performing the BWP switching,
    wherein the second procedure includes:
        ignoring the PDCCH for the BWP switching, and
        continuously performing the ongoing random access procedure, and
    wherein the first procedure or the second procedure is selected based on whether the random access procedure is initiated on a secondary cell (SCell) or a special cell (SpCell).

2. A method performed by a base station in a wireless communication system, the method comprising:
    transmitting, to a terminal, bandwidth part (BWP) configuration information including information associated with an active BWP of a serving cell; and
    transmitting, to the terminal, a physical downlink control channel (PDCCH) for a BWP switching of the serving cell, the PDCCH including a downlink assignment or an uplink grant,
    wherein, in response to transmitting the PDCCH for the BWP switching of the serving cell and identifying that there is no ongoing random access procedure associated with the serving cell, the BWP switching is performed by switching to a BWP indicated by the PDCCH,
    wherein, in response to transmitting the PDCCH for the BWP switching of the serving cell and identifying that there is an ongoing random access procedure associated with the serving cell, a first procedure or a second procedure is performed, wherein the first procedure is performed by stopping the ongoing random access procedure, performing the BWP switching to the BWP indicated by the PDCCH, and initiating another random access procedure after performing the BWP switching, wherein the second procedure is performed by ignoring the PDCCH for the BWP switching, and continuously performing the ongoing random access procedure, and wherein the first procedure or the second procedure is selected based on whether the random access procedure is initiated on a secondary cell (SCell) or a special cell (SpCell).

3. A terminal in a wireless communication system, the terminal comprising:
a transceiver configured to transmit or receive a signal; and
a controller coupled with the transceiver and configured to:
receive, from a base station, a physical downlink control channel (PDCCH) for a bandwidth part (BWP) switching of a serving cell, the PDCCH including a downlink assignment or an uplink grant,
in response to receiving the PDCCH for the BWP switching of the serving cell, identify whether there is ongoing random access procedure associated with the serving cell,
in response to identifying that there is no ongoing random access procedure based on receiving the PDCCH for the BWP switching of the serving cell, perform the BWP switching to a BWP indicated by the PDCCH, and
in response to identifying that there is an ongoing random access procedure based on the receiving the PDCCH for the BWP switching of the serving cell, perform a first procedure or a second procedure,
wherein the first procedure includes:
stopping the ongoing random access procedure,
performing the BWP switching to the BWP indicated by the PDCCH, and
initiating another random access procedure after performing the BWP switching, wherein the second procedure includes:
ignoring the PDCCH for the BWP switching, and
continuously performing the ongoing random access procedure, and wherein the first procedure or the second procedure is selected based on whether the random access procedure is initiated on a secondary cell (SCell) or a special cell (SpCell).

4. A base station in a wireless communication system, the base station comprising:
a transceiver configured to transmit and receive signals; and
a controller coupled with the transceiver and configured to:
transmit, to a terminal, bandwidth part (BWP) configuration information including information associated with an active BWP of a serving cell; and
transmit, to the terminal, a physical downlink control channel (PDCCH) for BWP switching of the serving cell, the PDCCH including a downlink assignment or an uplink grant,
wherein, in response to transmitting the PDCCH for the BWP switching of the serving cell and identifying that there is no ongoing random access procedure associated with the serving cell, the BWP switching is performed by switching to a BWP indicated by the PDCCH,
wherein, in response to transmitting the PDCCH for the BWP switching of the serving cell and identifying that there is an ongoing random access procedure associated with the serving cell, a first procedure or a second procedure is performed,
wherein the first procedure is performed by stopping the ongoing random access procedure, performing the BWP switching to the BWP indicated by the PDCCH, and initiating another random access procedure after performing the BWP switching,
wherein the second procedure is performed by ignoring the PDCCH for the BWP switching, and continuously performing the ongoing random access procedure, and
wherein the first procedure or the second procedure is selected based on whether the random access procedure is initiated on a secondary cell (SCell) or a special cell (SpCell).

* * * * *